(12) United States Patent
O'Donnell et al.

(10) Patent No.: US 12,544,508 B2
(45) Date of Patent: Feb. 10, 2026

(54) ADAPTIVE PRESSURE CONTROL FILTER FOR A FLUID MANAGEMENT SYSTEM

(71) Applicant: BOSTON SCIENTIFIC SCIMED, INC., Maple Grove, MN (US)

(72) Inventors: John O'Donnell, Tipperary (IE); Prasanna Balan, Tipperary (IE); Yogesh Gudekar, Tipperary (IE)

(73) Assignee: BOSTON SCIENTIFIC SCIMED, INC., Maple Grove, MN (US)

( * ) Notice: Subject to any disclaimer, the term of this patent is extended or adjusted under 35 U.S.C. 154(b) by 321 days.

(21) Appl. No.: 17/186,989

(22) Filed: Feb. 26, 2021

(65) Prior Publication Data

US 2021/0268182 A1    Sep. 2, 2021

Related U.S. Application Data

(60) Provisional application No. 62/982,384, filed on Feb. 27, 2020.

(51) Int. Cl.
*A61M 5/168* (2006.01)
*A61M 5/142* (2006.01)
*G16H 20/17* (2018.01)

(52) U.S. Cl.
CPC ........ *A61M 5/16804* (2013.01); *A61M 5/142* (2013.01); *A61M 5/16877* (2013.01);
(Continued)

(58) Field of Classification Search
CPC .............. A61M 5/16804; A61M 5/142; A61M 5/16877; A61M 2205/18;
(Continued)

(56) References Cited

U.S. PATENT DOCUMENTS

| 4,526,574 A | 7/1985 | Pekkarinen |
| 4,650,462 A | 3/1987 | DeSatnick et al. |

(Continued)

FOREIGN PATENT DOCUMENTS

| CN | 105979891 A | 9/2016 |
| EP | 2726118 A1 | 1/2013 |

(Continued)

OTHER PUBLICATIONS

International Search Report and Written Opinion dated Jun. 1, 2021 for International Application No. PCT/US2021/019949.

*Primary Examiner* — Rachael E Bredefeld
*Assistant Examiner* — Fatimata Sahra Diop
(74) *Attorney, Agent, or Firm* — Seager, Tufte & Wickhem, LLP

(57) ABSTRACT

Methods and systems for controlling parameters of a fluid management and medical device system. An illustrative method may comprise initiating a command to acquire a plurality of data signals at predetermined time intervals from a sensor of a fluid management system or a medical device. Upon acquisition, the data signals may be stored in a buffer until a predetermined minimum number of data signals have been acquired. A profile may be generated with the plurality of data signal. The profile may be filtered with an adaptive data filter configured to perform one or more passes over the profile. Each pass of the one or more passes of the adaptive data filter may monitor and analyze a different feature of the data signals and the one or more passes may vary depending on the one or more settings received from the sub system of the fluid management system.

20 Claims, 13 Drawing Sheets

(52) U.S. Cl.
CPC ......... *G16H 20/17* (2018.01); *A61M 2205/18* (2013.01); *A61M 2205/3355* (2013.01); *A61M 2205/3368* (2013.01); *A61M 2205/42* (2013.01); *A61M 2205/502* (2013.01); *A61M 2205/52* (2013.01)

(58) Field of Classification Search
CPC .. A61M 2205/3355; A61M 2205/3368; A61M 2205/42; A61M 2205/502; A61M 2205/52; A61M 3/0202; A61M 1/774; A61M 3/0216; A61M 3/022; A61M 3/0258; A61M 2205/3331; A61M 2205/3334; A61M 2205/3344; A61M 2205/3393; A61M 2205/505; A61M 2205/581; A61M 2205/583; A61M 2205/50; G16H 20/17; G16H 40/63; G16H 10/60; G16H 20/10; G16H 20/13; G16H 40/60; G16H 40/67; A61B 1/015
See application file for complete search history.

(56) References Cited

U.S. PATENT DOCUMENTS

| | | |
|---|---|---|
| 4,998,914 A | 3/1991 | Wiest et al. |
| 5,460,490 A | 10/1995 | Carr et al. |
| 5,464,391 A | 11/1995 | Devale |
| 5,630,798 A | 5/1997 | Beiser et al. |
| 5,685,821 A | 11/1997 | Pike |
| 5,709,670 A | 1/1998 | Vancaillie et al. |
| 5,800,383 A | 9/1998 | Chandler et al. |
| 5,810,770 A | 9/1998 | Chin et al. |
| 5,830,180 A | 11/1998 | Chandler et al. |
| 5,882,339 A | 3/1999 | Beiser et al. |
| 6,024,720 A | 2/2000 | Chandler et al. |
| 6,077,246 A | 6/2000 | Kullas et al. |
| 6,159,160 A | 12/2000 | Hsei et al. |
| 6,595,957 B1 | 7/2003 | Griffiths et al. |
| 6,896,664 B2 | 5/2005 | Novak |
| 7,083,601 B1 | 8/2006 | Cosmescu |
| 7,604,610 B2 | 10/2009 | Shener et al. |
| 7,981,073 B2 | 7/2011 | Möllstam et al. |
| D657,865 S | 4/2012 | Williams |
| 8,444,592 B2 | 5/2013 | Williams et al. |
| 8,512,326 B2 | 8/2013 | Shadduck et al. |
| 8,597,228 B2 | 12/2013 | Pyles et al. |
| 8,728,066 B2 | 5/2014 | Shadduck et al. |
| 8,790,303 B2 | 7/2014 | Williams et al. |
| 8,795,232 B2 | 8/2014 | Visconti et al. |
| 8,974,448 B2 | 3/2015 | Germain et al. |
| 9,084,847 B2 | 7/2015 | Klein et al. |
| 9,233,193 B2 | 1/2016 | Truckai et al. |
| 9,247,983 B2 | 2/2016 | Truckai et al. |
| 9,254,142 B2 | 2/2016 | Germain et al. |
| 9,272,086 B2 | 3/2016 | Williams et al. |
| 9,289,110 B2 | 3/2016 | Woolford et al. |
| 9,322,729 B2 | 4/2016 | Heide et al. |
| 9,339,235 B2 * | 5/2016 | Rodriguez-Llorente .................... A61B 5/725 |
| 9,439,677 B2 | 9/2016 | Germain et al. |
| 9,439,720 B2 | 9/2016 | Germain et al. |
| 9,474,848 B2 | 10/2016 | Williams et al. |
| 9,486,233 B2 | 11/2016 | Bek et al. |
| 9,498,244 B2 | 11/2016 | Orczy-Timko et al. |
| 9,549,754 B2 | 1/2017 | Shadduck et al. |
| 9,597,149 B2 | 3/2017 | Germain et al. |
| 9,603,990 B2 | 3/2017 | Woolford |
| 9,636,170 B2 | 5/2017 | Germain et al. |
| 9,737,362 B2 | 8/2017 | Germain et al. |
| 9,743,979 B2 | 8/2017 | Germain et al. |
| 9,770,541 B2 | 9/2017 | Carr et al. |
| 9,827,037 B2 | 11/2017 | Germain et al. |
| 9,839,473 B2 | 12/2017 | Germain et al. |
| 9,889,246 B2 | 2/2018 | Noolford |
| 9,901,665 B2 | 2/2018 | Klein et al. |
| 9,907,563 B2 | 3/2018 | Germain et al. |
| 9,943,639 B2 | 4/2018 | Germain et al. |
| 9,999,466 B2 | 6/2018 | Germain et al. |
| 10,004,556 B2 | 6/2018 | Orczy-Timko et al. |
| 10,178,942 B2 | 1/2019 | Germain et al. |
| 10,238,412 B2 | 3/2019 | Bek et al. |
| 10,349,815 B2 | 7/2019 | Germain et al. |
| 10,368,912 B2 | 8/2019 | Truckai et al. |
| 10,441,353 B2 | 10/2019 | Germain et al. |
| 10,499,987 B2 | 12/2019 | Germain et al. |
| 10,518,005 B2 | 12/2019 | Carr et al. |
| 10,531,785 B2 | 1/2020 | Germain et al. |
| 10,531,912 B2 | 1/2020 | Germain et al. |
| 10,603,104 B2 | 3/2020 | Germain et al. |
| 10,667,857 B2 | 6/2020 | Shadduck et al. |
| 10,716,584 B2 | 7/2020 | Germain et al. |
| 10,751,451 B2 | 8/2020 | Klein et al. |
| 10,786,619 B2 | 9/2020 | Germain et al. |
| 2008/0154095 A1 | 6/2008 | Stubkjaer et al. |
| 2012/0191037 A1 | 7/2012 | Patel et al. |
| 2012/0283581 A1 * | 11/2012 | Olde .................... A61M 1/3639 600/485 |
| 2013/0079702 A1 | 3/2013 | Klein et al. |
| 2013/0172805 A1 | 7/2013 | Truckai et al. |
| 2013/0197471 A1 | 8/2013 | Williams et al. |
| 2013/0245599 A1 * | 9/2013 | Williams ................ A61M 1/77 604/113 |
| 2013/0253498 A1 | 9/2013 | Germain et al. |
| 2014/0200612 A1 | 7/2014 | Weir et al. |
| 2014/0336599 A1 | 11/2014 | Patel et al. |
| 2015/0164404 A1 | 6/2015 | Euliano et al. |
| 2015/0328379 A1 | 11/2015 | Carr et al. |
| 2016/0089184 A1 | 3/2016 | Truckai et al. |
| 2017/0000957 A1 | 1/2017 | Carr et al. |
| 2017/0027637 A1 | 2/2017 | Germain et al. |
| 2017/0056102 A1 | 3/2017 | Germain et al. |
| 2017/0090457 A1 * | 3/2017 | Pandurangan .......... F04C 14/00 |
| 2017/0203028 A1 | 7/2017 | Carr et al. |
| 2018/0000998 A1 | 1/2018 | Carr et al. |
| 2018/0132930 A1 | 5/2018 | Germain et al. |
| 2018/0207332 A1 | 7/2018 | Reever et al. |
| 2018/0231990 A1 | 8/2018 | Grubb |
| 2018/0271596 A1 | 9/2018 | Germain et al. |
| 2018/0296745 A1 | 10/2018 | Olde et al. |
| 2018/0361055 A1 * | 12/2018 | Pereira .................. A61M 3/022 |
| 2019/0143010 A1 | 5/2019 | Gaspredes et al. |
| 2019/0175204 A1 | 6/2019 | Bek et al. |
| 2019/0183362 A1 * | 6/2019 | Handler ................ A61B 5/725 |
| 2019/0201743 A1 * | 7/2019 | Meyer .................... A61B 5/097 |
| 2019/0316948 A1 * | 10/2019 | Karol .................... A61M 1/282 |
| 2019/0321096 A1 | 10/2019 | Germain et al. |
| 2019/0336166 A1 | 11/2019 | Truckai et al. |
| 2020/0100836 A1 | 4/2020 | Germain et al. |
| 2020/0121387 A1 | 4/2020 | Germain et al. |
| 2020/0246067 A1 | 8/2020 | Germain et al. |
| 2020/0281645 A1 | 9/2020 | Shadduck et al. |
| 2020/0315640 A1 | 10/2020 | Germain et al. |
| 2021/0364629 A1 * | 11/2021 | Ryder .................. G06V 10/255 |

FOREIGN PATENT DOCUMENTS

| | | |
|---|---|---|
| EP | 2758115 A1 | 7/2014 |
| EP | 2405954 B1 | 6/2017 |
| EP | 2445395 B1 | 11/2017 |
| EP | 2726118 B1 | 2/2018 |
| EP | 3305343 A1 | 4/2018 |
| WO | 2018236513 A1 | 12/2018 |

* cited by examiner

ADAPTIVE PRESSURE CONTROL FILTER FOR A FLUID MANAGEMENT SYSTEM

CROSS REFERENCE TO RELATED APPLICATIONS

The present application claims the benefit of and priority to U.S. Provisional Patent Application Ser. No. 62/982,384, filed on Feb. 27, 2020, the disclosure of which is incorporated herein by reference.

TECHNICAL FIELD

The disclosure is directed to a fluid management system. More particularly, the disclosure is directed to a system and method for providing a configurable data filter for use with a fluid management system.

BACKGROUND

Flexible ureteroscopy (fURS), gynecology, and other endoscopic procedures require the circulation of fluid for several reasons. Surgeons today deliver the fluid in various ways such as, for example, by hanging a fluid bag and using gravity to deliver the fluid, filling a syringe and manually injecting the fluid or using a peristaltic pump to deliver fluid from a reservoir at a fixed pressure or flow rate via a fluid management system. Fluid management systems may adjust the flow rate and/or pressure at which fluid is delivered from the reservoir based on data collected from a procedural device, such as, but not limited to, an endoscope. Of the known medical devices, systems, and methods, each has certain advantages and disadvantages. There is an ongoing need to provide alternative medical devices and fluid delivery systems.

SUMMARY

The disclosure is directed to systems and methods for providing a configurable data filter for use with a fluid management system.

In a first illustrative example, a method for controlling parameters of a fluid management and medical device system may comprise initiating a command at a controller of a fluid management system to acquire a plurality of data signals at predetermined time intervals from a sensor of the fluid management system or a medical device, storing the data signals in a buffer until a predetermined minimum number of data signals have been acquired, generating a raw data profile with the plurality of data signals, the raw data profile based on one or more settings received from a sub system of the fluid management system, filtering the raw data profile with an adaptive data filter, the adaptive data filter configured to perform one or more passes over the profile to generate a filtered profile, and controlling a variable of the fluid management system based on a parameter of the filtered profile. Each pass of the one or more passes of the adaptive data filter may monitor and analyze a different feature of the data signals and the one or more passes vary depending on the one or more settings received from the sub system of the fluid management system.

Alternatively or additionally to any of the examples above, in another example, the controller may be configured to skip or modify any of the one or more passes of the adaptive data filter.

Alternatively or additionally to any of the examples above, in another example, at least one pass of the adaptive data filter may be configured to reduce or eliminate noise in the raw data profile.

Alternatively or additionally to any of the examples above, in another example, at least one pass of the adaptive data filter may be configured to monitor and/or remove pulsation in the raw data profile.

Alternatively or additionally to any of the examples above, in another example, at least one pass of the adaptive data filter may be configured to average each oscillation within the raw data profile.

Alternatively or additionally to any of the examples above, in another example, at least one pass of the adaptive data filter may be configured to determine if a spike is present in the raw data profile.

Alternatively or additionally to any of the examples above, in another example, the adaptive data filter may be configured to receive a noise tolerance input from the sub system.

Alternatively or additionally to any of the examples above, in another example, the controller may be configured to automatically modify the adaptive data filter based on the noise tolerance input.

Alternatively or additionally to any of the examples above, in another example, the one or more settings provided by the sub system may include a maximum value of the raw data profile, a minimum value of the raw data profile, an average value of the raw data profile, and/or a signal to noise ratio of the raw data profile.

Alternatively or additionally to any of the examples above, in another example, controlling the variable of the fluid management system based on the parameter of the filtered profile may comprise controlling the variable based on a maximum value of the filtered profile, a minimum value of the filtered data profile, average value of the filtered profile, a frequency of the filtered profile, a spike detection of the filtered profile, and/or a peak to peak pulsation of the filtered profile.

Alternatively or additionally to any of the examples above, in another example, controlling the variable of the fluid management system based on the parameter of the filtered profile may comprise providing an alert to a user interface of the fluid management system if the filtered profile falls outside of a predetermined range.

Alternatively or additionally to any of the examples above, in another example, controlling the variable of the fluid management system based on the parameter of the filtered profile may comprise providing an alert to a user interface of the fluid management system if a rate of change of the filtered profile falls outside of a predetermined range.

Alternatively or additionally to any of the examples above, in another example, the plurality of data signals may comprise a plurality of pressure signals.

Alternatively or additionally to any of the examples above, in another example, the plurality of data signals may comprise a plurality of weight signals representative of an amount of fluid.

Alternatively or additionally to any of the examples above, in another example, the plurality of data signals may comprise a plurality of temperature signals.

In another example, a method for controlling parameters of a fluid management and medical device system may comprise initiating a command at a controller of a fluid management system to acquire a plurality of data signals at predetermined time intervals from a sensor of the fluid management system or a medical device, storing the data signals in a buffer until a predetermined minimum number of data signals have been acquired, generating a raw data profile with the plurality of data signals, the raw data profile based on one or more settings received from a sub system of the fluid management system, filtering the raw data profile with an adaptive data configured to perform a plurality passes over the profile to generate a filtered profile, the plurality of passes configured to reduce or eliminate noise in the raw data profile, monitor and/or remove pulsation in the raw data profile, average each oscillation within the raw data profile, and/or determine if a spike is present in the raw data profile, and controlling a variable of the fluid management system based on a parameter of the filtered profile. The plurality of passes may be varied and/or are omitted based on the one or more settings received from the sub system of the fluid management system.

In another example, a fluid management and medical device system may comprise a fluid management system and a medical device. The fluid management system may comprise a pump configured to pump fluid from a fluid supply source through the fluid management system at a fluid flow rate and a processing device including a user interface, the processing device configured to control the pump to maintain a target fluid flow rate based on a set of system operating parameters. The medical device may comprise an elongate shaft in fluid communication with the pump of the fluid management system and a pressure sensor disposed at a distal end of the elongate shaft. The processing device of the fluid management system may be configured to adjust the fluid flow rate based on data received from the pressure sensor of the medical device. The processing device may be configured to filter the data received from the pressure sensor of the medical device with an adaptive data filter, the adaptive data filter configured to perform a plurality passes over the data to generate a filtered profile, the plurality of passes configured to reduce or eliminate noise in the data, monitor and/or remove pulsation in the data, average each oscillation within the data, and/or determine if a spike is present in the data.

Alternatively or additionally to any of the examples above, in another example, the adaptive data filter may be configured to receive a request for filtered data from a sub system of fluid management system.

Alternatively or additionally to any of the examples above, in another example, the request may include one or more settings for generating a profile of the data.

Alternatively or additionally to any of the examples above, in another example, the request may include one or more settings for a type of filtered data.

Alternatively or additionally to any of the examples above, in another example, the processing device may be configured to automatically modify the adaptive data filter based on a noise tolerance input.

Alternatively or additionally to any of the examples above, in another example, the processing device may be configured to provide an alert to a user interface of the fluid management system if the filtered profile falls outside of a predetermined range.

Alternatively or additionally to any of the examples above, in another example, the processing device may be configured to provide an alert to a user interface of the fluid management system if a rate of change of the filtered profile falls outside of a predetermined range.

The above summary of some example embodiments is not intended to describe each disclosed embodiment or every implementation of the invention.

BRIEF DESCRIPTION OF THE DRAWINGS

The invention may be more completely understood in consideration of the following detailed description of various embodiments in connection with the accompanying drawings, in which.

Figure 1:
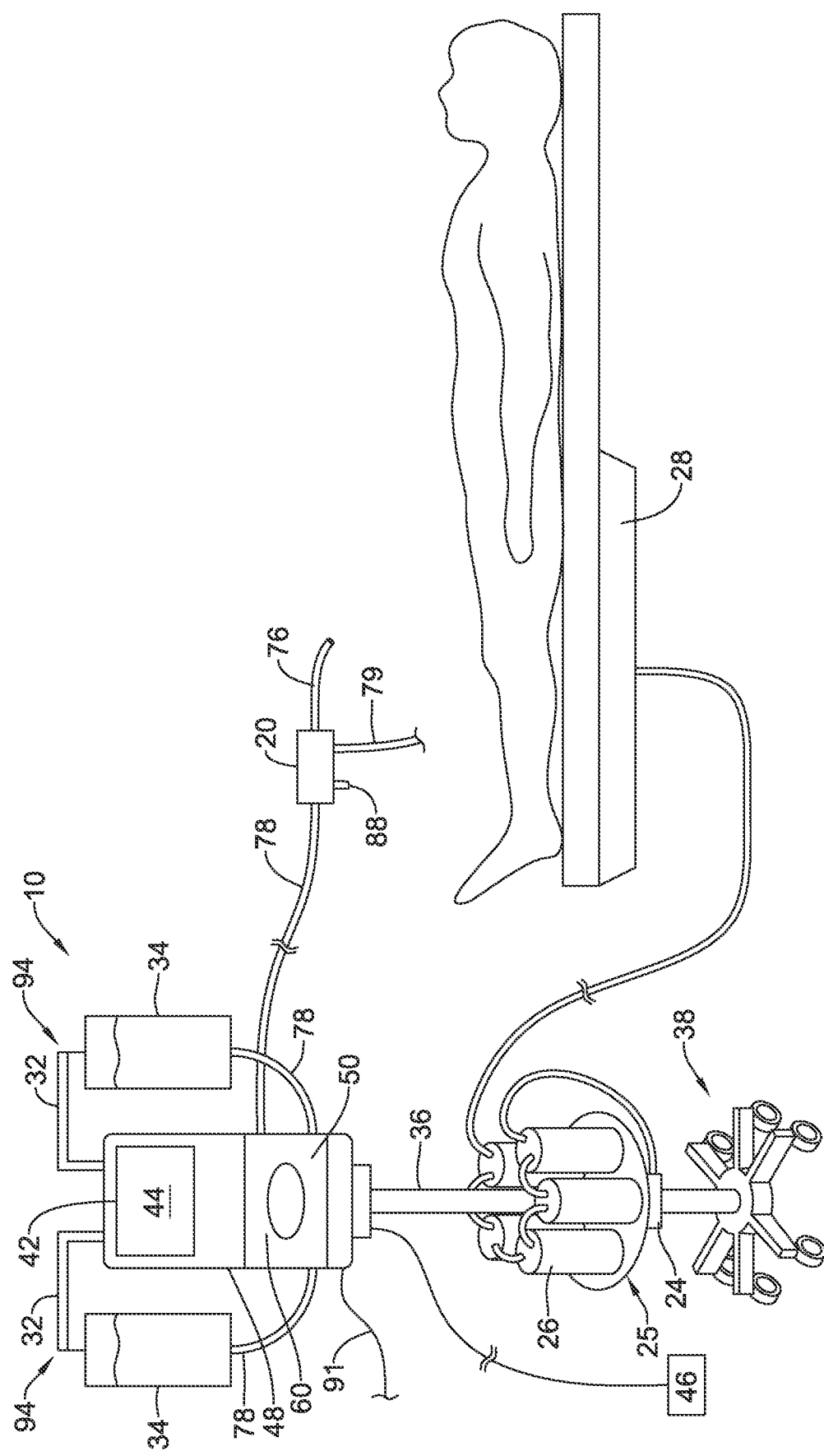
FIG. 1 is a schematic illustration of selected aspects of a fluid management system.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Relative terms such as "proximal", "distal", "advance", "retract", variants thereof, and the like, may be generally considered with respect to the positioning, direction, and/or operation of various elements relative to a user/operator/manipulator of the device, wherein "proximal" and "retract" indicate or refer to closer to or toward the user and "distal" and "advance" indicate or refer to farther from or away from the user. In some instances, the terms "proximal" and "distal" may be arbitrarily assigned in an effort to facilitate understanding of the disclosure, and such instances will be readily apparent to the skilled artisan. Other relative terms, such as "upstream", "downstream", "inflow", and "outflow" refer to a direction of fluid flow within a lumen, such as a body lumen, a blood vessel, or within a device.

Some fluid management systems for use in flexible ureteroscopy (fURS) procedures (e.g., ureteroscopy, percutaneous nephrolithotomy (PCNL), benign prostatic hyperplasia (BPH), transurethral resection of the prostate (TURP), etc.), gynecology, and other endoscopic procedures may regulate body cavity pressure when used in conjunction with an endoscope device such as, but not limited to, a Litho-Vue™ scope device using pressure and/or temperature data from the endoscope or other endoscopic device. Direct regulation of the intracavity pressure during a medical procedure may allow the fluid management system to safely drive system pressures of up to 600 mmHg to ensure no loss of flow during the procedure when tools are inserted into the working channel of the endoscope device. In some procedures, blood and/or debris may be present in the body cavity, which may negatively affect image quality through the endoscopic device. Fluid flow (e.g., irrigation) through the endoscopic device may be used to flush the body cavity to improve image quality. In some procedures, the body cavity may be relatively small and irrigation fluid may flow continuously, which can raise intracavity fluid pressure and/or system pressure (e.g., fluid pressure within the fluid management system itself).

Because the volume of some cavities is very small and the irrigation fluid is continuously flowing into the cavity, the flow of fluid can cause high pressures in the cavity. Increased intracavity fluid pressure and/or system pressure may pose risks to the patient under some circumstances. In some procedures, access sheaths are used to generate outflow from the cavity and reduce the pressure but in many cases access sheaths are not used which in turn can cause very high pressures in the cavity. In some cases, physicians may have no way of knowing what the pressure is in the cavity, so they may be inclined to keep the irrigation flow rates low and compromise their image quality and visualization to prevent high pressures in the cavity. In one illustrative example, it is believed that if the kidney withstands high pressures for prolonged periods of time or short instantaneous bursts of high pressures it can cause problems such as pyelovenous backflow and post procedural complications such as sepsis.

The measuring and monitoring of pressure, given its variance, creates an issue for the reliable interpretation of data and its impact on the system. For example, the pressure profile may oscillate causing inconsistent reading from the fluid management system. It is further contemplated that the pressure reading from the fluid management system may provide a pulsation signal or a signal that has noise. It may be desirable to deliver an interrupted profile of the pressure data that will provide greater reliability of the system. In some case, it may also be desirable for the fluid management system to also protect the system pressure output from pulsation of the system as excessive pulsation on the system will reduce the performance of the system and usability by the physician. Systems and methods for providing a configurable data filter for use with a fluid management system are desired.

FIG. 1 is a schematic view of a fluid management system 10 that may be used in an endoscopic procedure, such as fURS procedures. The fluid management system 10 may be coupled to a medical device 20 that allows flow of fluid therethrough. In some embodiments, the fluid management system 10 and/or the medical device 20 may include a pressure sensor. In some embodiments, the medical device 20 may be a Litho Vue™ scope device, or other endoscope. In an illustrative embodiment, the medical device 20 may include a temperature sensor to provide intracavity temperature feedback to the fluid management system 10, a pressure sensor to provide intracavity pressure feedback to the fluid management system 10, and/or a camera to provide visual feedback to the fluid management system 10. Some specific and/or additional features of the fluid management system 10 and/or the medical device 20 shown in FIG. 1 may not be specifically referenced with respect to FIG. 1, but will be discussed below and/or in conjunction with other figures. Such features are shown in FIG. 1 for context.

Briefly, the fluid management system 10 may include an inflow pump 50 configured to pump and/or transfer fluid from a fluid supply source 34 (e.g., a fluid bag, etc.) to the medical device 20 and/or a treatment site within a patient at a fluid flow rate. In some cases, the fluid may pass through a fluid warming system 60 prior to entering the medical device 20. The flow of fluid, the pressure of the fluid, the temperature of the fluid, and/or other operational parameters may be controlled by or at least partially controlled by a controller 48. The controller 48 may be in electronic communication (e.g., wired or wireless) with the medical device 20, the inflow pump 50, and/or the fluid warming system 60 to provide control commands and/or to transfer or receive data therebetween. For example, the controller 48 may receive data from the medical device 20 such as, but not limited to, pressure and temperature data. The controller 48 may then use the data received from the medical device 20 to control operational parameters of the inflow pump 50 and/or the fluid warming system 60.

In some embodiments, the controller 48 may be configured to operate at a target fluid flow rate in a flow control mode. In some embodiments, in the flow control mode, the controller 48 may be configured to control the inflow pump 50 to maintain the target fluid flow rate based on a set of system operating parameters while monitoring a measured pressure communicated to the controller 48 from a pressure sensor. In some embodiments, when the measured pressure reaches a preset pressure threshold, the controller 48 may be configured to automatically switch from the flow control mode to a pressure override mode in which the controller 48 automatically reduces the fluid flow rate below the target fluid flow rate to return the measured pressure at or below the preset pressure threshold. In some embodiments, the controller 48 may be configured to control the inflow pump 50 to maintain a desired intracavity fluid pressure at the treatment site and/or a target flow rate based on a set of system operating parameters.

The fluid management system 10 also includes a fluid management unit. An illustrative fluid management unit may include one or more fluid container supports, such as fluid supply source hanger(s) 32, each of which supports one or more fluid supply sources 34 (e.g., one or more fluid bags). In some embodiments, placement and/or weight of the fluid supply source 34 (e.g., the fluid bag) may be detected using a remote sensor and/or a supply load cell 94 associated with and/or operatively coupled to each fluid supply source hanger 32 and/or fluid container support. The controller 48 may be in electronic communication with the supply load cell 94. The fluid supply source hanger(s) 32 may receive a variety of sizes of fluid supply sources 34 such as, for example, 1 liter (L) to 5 L fluid supply sources (e.g., fluid bags). It will be understood that any number of fluid supply sources 34 may be used. Furthermore, fluid supply sources 34 of any size may be used depending on the procedure. In some embodiments, the fluid management unit may be mounted to a rolling stand, which may include a pole 36 and/or a base 38. The base 38 may include a plurality of wheels to facilitate easy movement of the fluid management unit when in use. However, it will be understood that the fluid supply source 34 may also be hung from the ceiling or other location depending on the clinical preference. The fluid supply source hanger(s) 32 may extend from the pole 36 and/or the controller 48 and may include one or more hooks from which one or more fluid supply sources 34 may be suspended. In some embodiments, the fluid used in the fluid management unit may be 0.9% saline. However, it will be understood that a variety of other fluids of varying viscosities may be used depending on the procedure.

In some embodiments, the fluid management unit may include a vacuum pump 24 and a collection container 26 in fluid communication with a collection drape 28. In some embodiments, the vacuum pump 24 may include a plurality of vacuum pumps. In some embodiments, the collection container 26 may include a plurality of containers, canisters, and/or other receptacles, which may be fluidly connected to each other and/or the vacuum pump 24. In some embodiments, the collection drape 28 may include a plurality of collection drapes. The vacuum pump 24 may be operatively and/or electronically connected to the controller 48. In some embodiments, the vacuum pump 24 may be disposed adjacent to and/or near the collection container 26, as illustrated in FIG. 1. In some embodiments, the vacuum pump 24 may be disposed within the fluid management system 10. Other configurations are also contemplated. In some embodiments, the collection container 26 may be operatively coupled to a collection load cell 25 to detect placement and/or weight of the collection container 26. In embodiments having a plurality of containers, canisters, and/or other receptacles, each container, canister, and/or receptacle may be operatively coupled to a corresponding collection load cell 25. The controller 48 may be in electronic communication with the collection load cell(s) 25.

The fluid management system 10 may also include one or more user interface components such as a touch screen interface 42. The touch screen interface 42 includes a display 44 and may include switches or knobs in addition to touch capabilities. In some embodiments, the controller 48 may include the touch screen interface 42 and/or the display 44. The touch screen interface 42 allows the user to input/adjust various functions of the fluid management system 10 such as, for example, flow rate, pressure, and/or temperature. The user may also configure parameters and alarms (such as, but not limited to, an intracavity pressure limit, a system pressure limit, etc.), information to be displayed, and the procedure mode. The touch screen interface 42 allows the user to add, change, and/or discontinue the use of various modular systems within the fluid management system 10. The touch screen interface 42 may also be used to change the fluid management system 10 between automatic and manual modes for various procedures. It is contemplated that other systems configured to receive user input may be used in place of or in addition to the touch screen interface 42.

The touch screen interface 42 may be configured to include selectable areas like buttons and/or may provide a functionality similar to physical buttons as would be understood by those skilled in the art. The display 44 may be configured to show icons related to modular systems and devices included in the fluid management system 10. The display 44 may also include a flow rate display. The flow rate display may be determined based on a desired threshold for flow rate set by the user prior to the procedure or based on known common values, etc. In some embodiments, the operating parameters may be adjusted by touching the corresponding portion of the touch screen interface 42. The touch screen interface 42 may also display visual alerts and/or audio alarms if parameters (e.g., flow rate, pressure, temperature, etc.) are above or below predetermined thresholds and/or ranges. The touch screen interface 42 may also be configured to display the amount of fluid remaining in the fluid supply source 34, and/or any other information the user may find useful during the procedure. In some embodiments, the fluid management system 10 may also include further user interface components such as an optional foot pedal 46, a heater user interface, a fluid control interface, or other device to manually control various modular systems. For example, the optional foot pedal 46 may be used to manually control flow rate. Some illustrative displays and other user interface components are described in described in commonly assigned U.S. Patent Application Publication No. 2018/0361055, titled AUTOMATED FLUID MANAGEMENT SYSTEM, the entire disclosure of which is hereby incorporated by reference.

The touch screen interface 42 may be operatively connected to or may be a part of the controller 48. The controller 48 may be a computer, tablet computer, or other processing device. The controller 48 may be operatively connected to one or more system components such as, for example, the inflow pump 50, the fluid warming system 60, a fluid deficit management system, etc. In some embodiments, these features may be integrated into a single unit. The controller 48 is capable of and configured to perform various functions such as calculation, control, computation, display, etc. The controller 48 is also capable of tracking and storing data pertaining to the operations of the fluid management system 10 and each component thereof. In an illustrative embodiment, the controller 48 includes wired and/or wireless network communication capabilities, such as Ethernet or Wi-Fi, through which the controller 48 may be connected to, for example, a local area network. The controller 48 may also receive signals from one or more of the sensors of the fluid management system 10. In some embodiments, the controller 48 may communicate with databases for best practice suggestions and the maintenance of patient records which may be displayed to the user on the display 44.

The fluid management system 10 may be user selectable between different modes based on the procedure, patient characteristics, etc. For example, different modes may include, but are not limited to, Limit mode, Notification mode, etc. Once a mode has been selected by the user, selected system parameters such as target fluid flow rate, intracavity fluid pressure limit, system fluid pressure limit, fluid deficit, and/or temperature may be provided to and/or input by the user via the touch screen interface 42 and/or the display 44. The exemplary parameters of the specific modes may be previously determined and loaded onto the controller 48 using, for example, software. Thus, when a user selects a procedure from an initial display on the display 44 of the touch screen interface 42, these known parameters may be loaded from the controller 48 to the various components of the fluid management system 10, such as, but not limited to the inflow pump 50, the fluid warming system 60, the fluid deficit management system, etc. The fluid management system 10 may also be user selectable between automatic and manual control. For example, for certain procedures, the user may wish to manually adjust a fluid flow rate, fluid pressure, and/or other parameters. Once the user has selected the manual control on, for example, the touch screen interface 42, the user may the adjust fluid flow rate or fluid pressure via other manual interfaces such as the optional foot pedal 46, for example. If the user selects an automatic control, the user may be prompted to select or input via the touch screen interface 42 which medical device 20 is being used so that the controller 48 may determine which data and/or parameters to use to facilitate control of the fluid management system 10. In some embodiments, the fluid management system 10 may be configured to verify the medical device 20 selected is actually being used.

In some embodiments, the fluid management system 10 may include visual software or image recognition and analysis software. For example, the medical device 20 may include a camera 70 (e.g., FIGS. 2 and 4). In some embodiments, the controller 48 may be configured to include visual software/image recognition software that can detect visual noise based on variations in brightness (e.g., light monitoring), contrast, or color pixilation. If the image provided to the controller 48 is determined to be not sufficiently clear or sharp, the fluid management system 10 may temporarily increase the fluid flow rate or the fluid pressure to flush out debris from the treatment site to sharpen/clear the image. The fluid flow rate or the fluid pressure may be manually or automatically increased for a temporary time (e.g., a predetermined time period) or until the field of view is deemed to be sufficiently clear. This temporary increase ensures that the time at which the fluid flow rate or the fluid pressure is increased is limited to ensure that intracavity pressure does not exceed safe limits.

For example, the fluid management system 10 may recognize a red hue in the irrigation (a sign of blood) and signal to the inflow pump 50 to increase the fluid flow rate above the target fluid flow rate until the blood is cleared from the field of view. Alternatively, the controller 48 may provide a visual alert on the display 44 or an audible alert to the physician or nurse that a cloudy view has been detected and the user may then adjust the fluid flow rate manually. In another example, in instances where there is a significant amount of debris, light reflected from the debris may brighten the image substantially. In this situation, the controller 48 detects this inordinate brightness and signals to the inflow pump 50 to increase the fluid flow rate to flush away and/or remove debris. Once the reflected light has been reduced as the debris is flushed clear of the field of view of the vision system, the inflow pump 50 is controlled by the controller 48 to reduce the fluid flow rate. In some cases, the physician may create a baseline level for visibility at which he or she prefers to initiate a field clearing flow of fluid and input these parameters into the fluid management system 10 via the touch screen interface 42 prior to the procedure. Once the baseline has been created, the fluid management system 10 may monitor the visual feed for variation in the picture and automatically adjust the fluid flow rate as necessary.

In order to adjust the fluid flow rate or the fluid pressure through the fluid management system 10, the fluid management unit may include one or more pressurization or flow-generating devices such as the inflow pump 50. In some embodiments, the inflow pump 50 may be a peristaltic pump. In some embodiments, the inflow pump 50 may include multiple pumps or more than one pump. The inflow pump 50 may be electrically driven and may receive power from a line source such as a wall outlet, an external or internal electrical storage device such as a disposable or rechargeable battery, and/or an internal power supply. The inflow pump 50 may operate at any desired speed sufficient to deliver fluid at a target pressure such as, for example, 5 mmHg to 50 mmHg, and/or at a target fluid flow rate. As noted herein, the inflow pump 50 may be automatically adjusted based on, for example, intracavity pressure and/or temperature readings within the treatment site and/or visual feedback from the medical device 20. The inflow pump 50 may also be manually adjusted via, for example, the optional foot pedal 46, the touch screen interface 42, or a separate fluid controller. While not explicitly shown, the fluid controller may be a separate user interface including buttons that allow the user to increase or decrease the speed and/or the output of the inflow pump 50. Alternatively, the fluid controller may be incorporated into the main processing device and receive input via the touch screen interface 42. In some embodiments, the fluid management system 10 may include multiple pumps having different flow capabilities. In some embodiments, a flow rate sensor 77 (e.g., FIG. 5) may be located before and/or after the inflow pump 50 to measure the actual fluid flow rate. The flow rate sensor 77 may be operably connected to the controller 48 and data from the flow rate sensor 77 may be used by the controller 48 to change selected system parameters.

The fluid flow rate and/or the fluid pressure of the fluid at any given time may be displayed on the display 44 to allow the operating room (OR) visibility for any changes. If the OR personnel notice a change in fluid flow rate and/or fluid pressure that is either too high or too low, the user may manually adjust the fluid flow rate and/or the fluid pressure back to a preferred level. This may happen, for example, as physicians insert and remove tools into the working channel of the medical device 20. The fluid management system 10 may also monitor and automatically adjust the fluid flow rate and/or the fluid pressure based on previously set parameters, as discussed herein. This feature may also be beneficial when fluid flow is provided manually such as an assistant injecting irrigation through a syringe.

In some embodiments, the fluid management system 10 may automatically adjust the fluid flow rate and/or the fluid pressure based on a measured intracavity temperature and/or a measured pressure, for example when the measured pressure reaches a preset pressure threshold. In some embodiments, the measured pressure may be an intracavity pressure measured within the treatment site, and the preset pressure threshold may be an intracavity pressure limit. The intracavity temperature and/or the intracavity pressure may be measured in situ using a temperature sensor 72 and/or a pressure sensor 74 mounted on the medical device 20 (e.g., FIG. 2) used in conjunction with the fluid management system 10. In some embodiments, the measured pressure may be a system pressure measured within the fluid management system 10, and the preset pressure threshold may be a system pressure limit. The system pressure may be measured within the fluid management system 10 using a pressure sensor 67 (e.g., FIG. 5) disposed within the fluid management system 10. In some embodiments, the fluid management system 10 may include pressure monitoring software so that the inflow pump 50 may be configured by the user to be automatically started, stopped, and/or speed adjusted by the fluid management system 10 to maintain a fluid pressure delivered to the treatment site at a target pressure and/or within a predetermined pressure range. For example, the pressure sensor 74 may detect intracavity pressure within the treatment site (for example, a kidney or uterus) and automatically alter the fluid flow rate and/or the fluid pressure within the fluid management system 10 based on the measured intracavity (e.g., intrarenal or intrauterine) pressure. If the intracavity pressure is too high, the fluid management system 10 may decrease the fluid flow rate and/or the fluid pressure and if the intracavity pressure is too low, the fluid management system 10 may increase the fluid flow rate and/or the fluid pressure.

Figure 2:
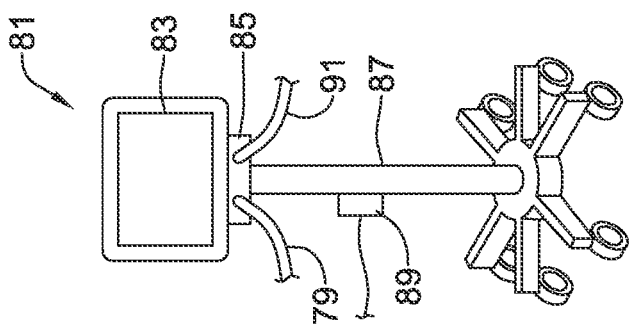
FIG. 2 illustrates selected aspects of a medical device and a workstation of the system of FIG. 1.
Figure 2:
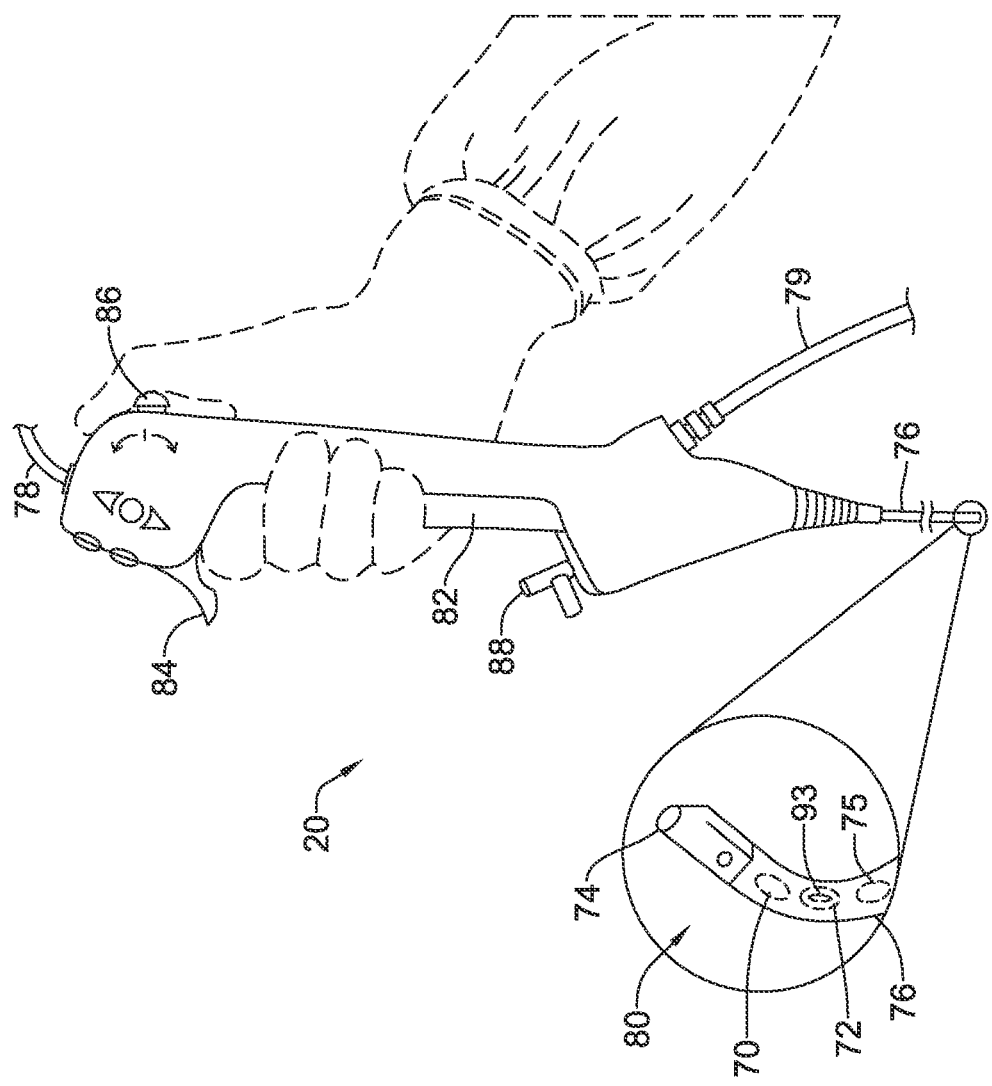
Figure 3:
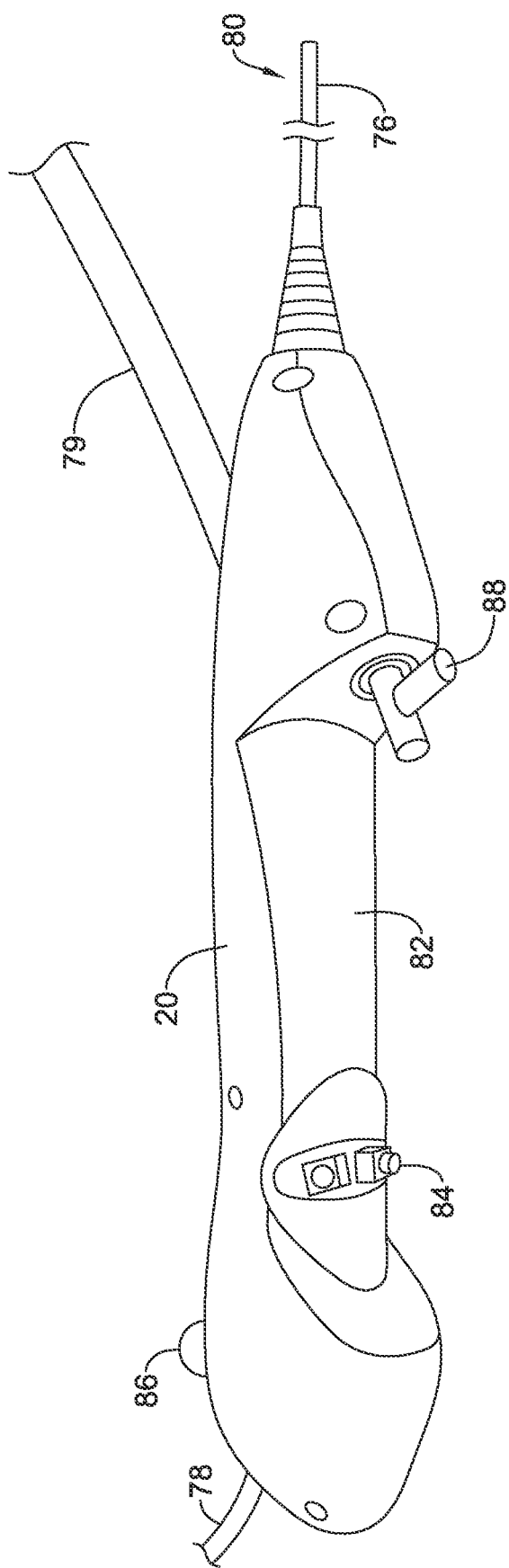
FIG. 3 illustrates selected aspects of the medical device of FIG. 2.
Figure 4:
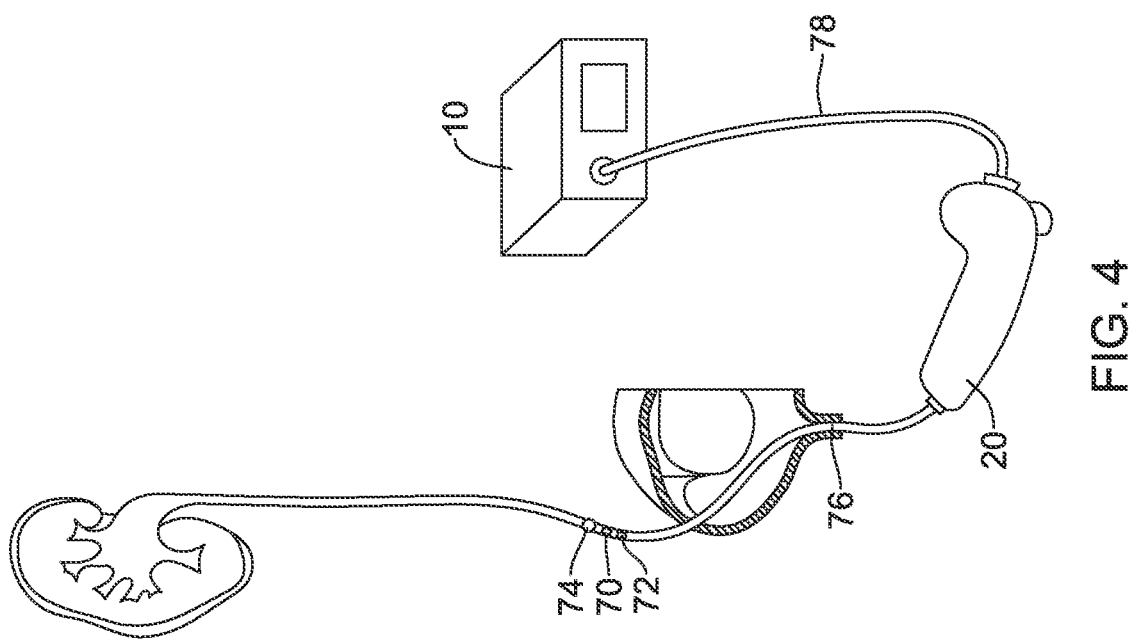
FIG. 4 is a schematic illustration of the medical device of FIG. 2 in situ.

FIGS. 2-4 illustrate aspects of the medical device 20 that may be used in conjunction with the fluid management system 10. In the illustrated embodiments, the medical device 20 may be a ureteroscope such as a LithoVue™ scope. However, other medical devices, such as another endoscope, may be used in addition to or in place of a ureteroscope. The medical device 20 may be configured to deliver fluid from the fluid management system 10 to the treatment site via an elongate shaft 76 configured to access the treatment site within the patient. In some embodiments, the inflow pump 50 may be in fluid communication with the elongate shaft 76. The elongate shaft 76 may include one or more working lumens for receiving a flow of fluid or other medical devices therethrough. The medical device 20 is connected to the fluid management system 10 via one or more supply line(s) 78 (e.g., a tube), as shown in FIGS. 1 and 4 for example.

In some embodiments, the medical device 20 may be in electronic communication with a workstation 81 via a wired connection 79. The workstation 81 may include a touch panel computer 83, an interface box 85 for receiving the wired connection 79, a cart 87, and a power supply 89, among other features. In some embodiments, the interface box 85 may be configured with a wired or wireless communication connection 91 with the controller 48 of the fluid management system 10. The touch panel computer 83 may include at least a display screen and an image processor. In some embodiments, the workstation 81 may be a multi-use component (e.g., used for more than one procedure) while the medical device 20 may be a single use device, although this is not required. In some embodiments, the workstation 81 may be omitted and the medical device 20 may be electronically coupled directly to the controller 48 of the fluid management system 10.

In some embodiments, the one or more supply line(s) 78 from the fluid management system 10 to the medical device 20 may be formed of a material the helps dampen the peristaltic motion created by the inflow pump 50. In some embodiments, the supply line(s) 78 may formed from small diameter tubing less than or equal to 1/16 inches (1.5875 millimeters) in diameter. However, it will be understood that tubing size may vary based on the application. The supply line(s) 78 and/or the tubing may be disposable and provided sterile and ready to use. Different types of tubing may be used for various functions within the fluid management system 10. For example, one type of tubing may be used for fluid heating and fluid flow control to the medical device 20 while another type of tubing may be used for irrigation within the body and/or the treatment site.

As shown in FIG. 2, the medical device 20 may include one or more sensors proximate a distal end 80 of the elongate shaft 76. For example, the medical device 20 may include a pressure sensor 74 at a distal tip of the elongate shaft 76 to measure intracavity pressure within the treatment site. The medical device 20 may also include other sensors such as, for example, a temperature sensor 72, a Fiber Bragg grating optical fiber 75 to detect stresses, and/or an antenna or electromagnetic sensor 93 (e.g., a position sensor). In an illustrative embodiment, the distal end 80 of the medical device 20 may also include at least one camera 70 to provide a visual feed to the user on the display screen of the touch panel computer 83. In another embodiment, the medical device 20 may include two cameras 70 having different communications requirements or protocols so that different information may be relayed to the user by each camera 70. When so provided, the user may switch back and forth between cameras 70 at will through the touch screen interface 42 and/or the touch panel computer 83. While not explicitly shown, the elongate shaft 76 may include one or more working lumens for receiving the fluid and/or other medical devices.

In some embodiments, the location of the distal end 80 of the elongate shaft 76 may be tracked during use. For example, a mapping and navigation system may include an operating table (or other procedural or examination table or chair, etc.) configured to act or function as an electromagnetic generator to generate a magnetic field of a known geometry. Alternatively, or additionally, an electromagnetic generator separate from the operating table may be provided. The operating table and/or the electromagnetic generator may be coupled to a control unit which may include among other features, a processor, a memory, a display, and an input means. A position sensor (e.g., the electromagnetic sensor 93, etc.) or other antenna, may be incorporated into the distal end 80 of the elongate shaft 76 of the medical device 20. The position sensor may be configured for use in sensing a location of the position sensor in the magnetic field of the mapping and navigation system. In some embodiments, the position sensor may be electronically coupled to the workstation 81. When the position sensor is in the magnetic field, the location of the position sensor can be mathematically determined relative to the electromagnetic field source (e.g., the operating table and/or the electromagnetic generator). The workstation 81 and the control unit may communicate to determine the position of the position sensor relative to the patient.

The medical device 20 includes a handle 82 coupled to a proximal end of the elongate shaft 76. The handle 82 may have a fluid flow on/off switch 84, which allows the user to control when fluid is flowing through the medical device 20 and into the treatment site. The handle 82 may further include other buttons 86 that perform other various functions. For example, in some embodiments, the handle 82 may include buttons to control the temperature of the fluid. It will be understood that while the exemplary embodiment describes a ureteroscope, the features detailed above may also be directly integrated into a cystoscope, an endoscope, a hysteroscope, or virtually any device with an image capability. In some embodiments, the medical device 20 may also include a drainage port 88 which may be connected to a drainage system. Some illustrative drainage systems are described in commonly assigned U.S. Patent Application Publication No. 2018/0361055, titled AUTOMATED FLUID MANAGEMENT SYSTEM, the disclosure of which is hereby incorporated by reference.

In some embodiments, the controller 48 may be configured to calculate a fluid deficit when the distal end 80 of the elongate shaft 76 is disposed within the patient, the fluid deficit being representative of fluid lost, absorbed by the patient, and/or otherwise unaccounted for during a procedure. In some embodiments, the controller 48 may be configured to notify a user when the total fluid deficit reaches a preset fluid deficit limit. In some embodiments, the controller 48 may be configured to stop the inflow pump 50 and/or the vacuum pump 24 when the total fluid deficit reaches the preset fluid deficit limit. In some embodiments, the controller 48 may be configured to notify a user when a total amount of fluid infused reaches a preset fluid infusion limit. In some embodiments, the controller 48 may be configured to stop the inflow pump 50 and/or the vacuum pump 24 when the total amount of fluid infused reaches the preset fluid infusion limit.

In some embodiments, the controller 48 may be configured to monitor the amount of fluid in the fluid supply source 34 through weight using, for example, the supply load cell 94, a scale, or other suitable means. The supply load cell 94 may be used by the controller 48 to determine a weight of the fluid supply source 34 attached to the fluid supply source hanger 32 to compare an initial amount of fluid in the fluid supply source 34 to a current amount of fluid remaining in the fluid supply source 34. The readout of the supply load cell 94 may be shown to the user on the display 44. As the procedure proceeds, the readout of the supply load cell 94 may be updated in real time to alert the physician to how much fluid is left in the fluid supply source 34 and this amount may then be used to determine how much fluid has been infused into the patient. In some embodiments, the amount of fluid remaining in the fluid supply source 34 may be shown. An alert may be shown on the display 44 with an audible signal when, for example, 10% of the fluid is left in the fluid supply source 34. In some embodiments, the supply load cell 94 may connect to the display 44 via a wireless (e.g., Wi-Fi) signal. In some embodiments, the supply load cell 94 may be connected to the display 44 via a hard wire connection. During the procedure, if the fluid supply source 34 becomes empty, it may be replaced with a full or unused fluid supply source 34.

Similarly, the controller 48 may be configured to monitor the amount of fluid in the collection container 26 through weight using, for example, the collection load cell 25, a scale, or other suitable means. The collection load cell 25 may be used by the controller 48 to determine a weight of the collection container 26 to compare an initial amount of fluid in the collection container 26 to a current amount of fluid in the collection container 26. The readout of the collection load cell 25 may be shown to the user on the display 44. As the procedure proceeds, the readout of the collection load cell 25 may be updated in real time to alert the physician to how much fluid is in the collection container 26 and this amount may then be used to determine how much fluid has been collected from the patient and/or the collection drape 28. In some embodiments, the amount of fluid in the collection container 26 may be shown. An alert may be shown on the display 44 with an audible signal when, for example, 10% of an initial empty volume is left in the collection container 26. In some embodiments, the collection load cell 25 may connect to the display 44 via a wireless (e.g., Wi-Fi) signal. In some embodiments, the collection load cell 25 may be connected to the display 44 via a hard wire connection. During the procedure, if the collection container 26 becomes full, it may be emptied and placed back into use, or the collection container 26 may be replaced by an empty collection container.

Figure 5:
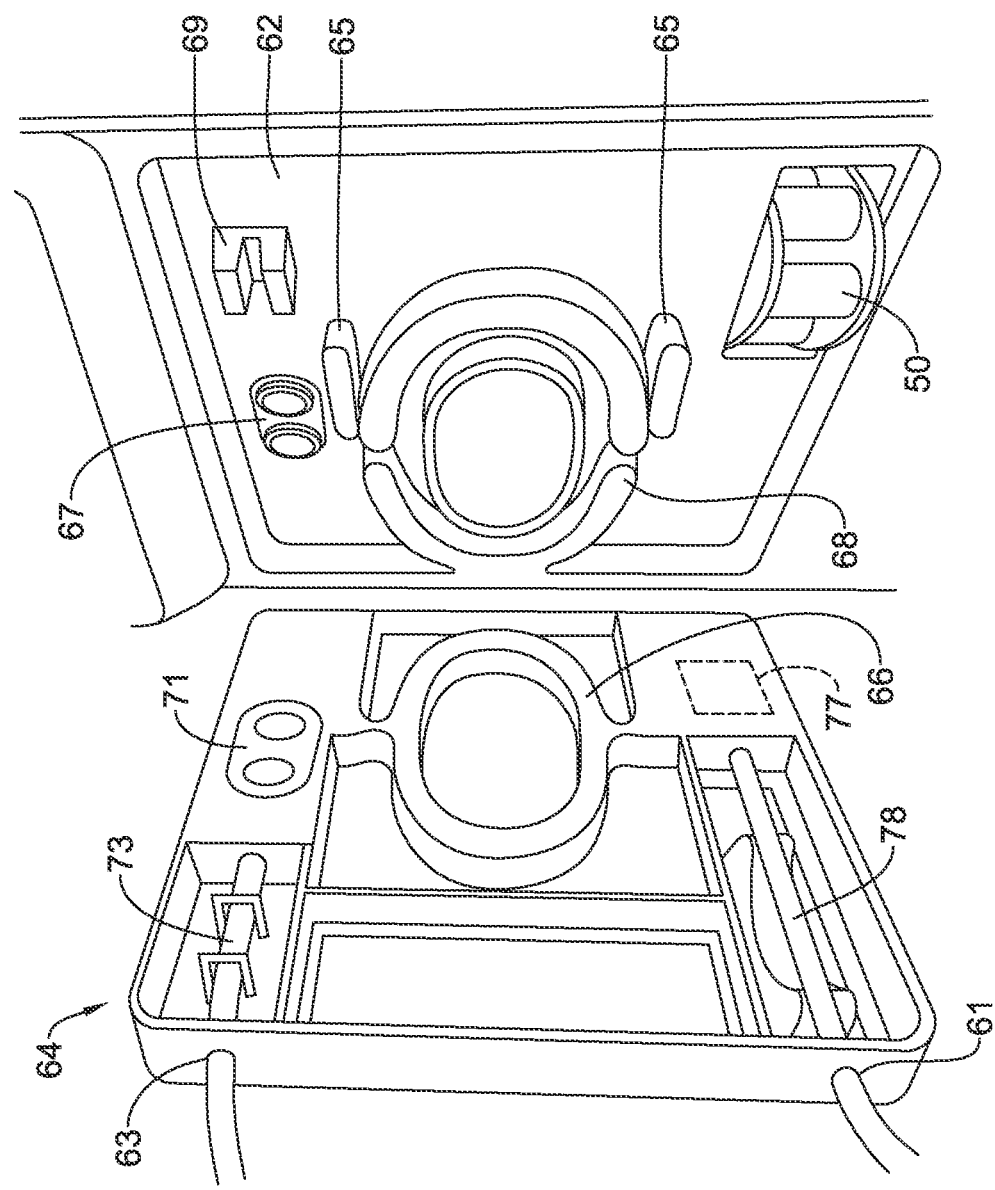
FIG. 5 is a partial perspective view illustrating selected aspects of a heater assembly and cassette of the system of FIG. 1.

In some embodiments, the fluid management system 10 may include a fluid warming system 60, as shown in FIG. 5, for heating fluid to be delivered to the patient. The fluid warming system 60 may include a heater 62 and a heater cassette 64. The heater cassette 64 may be configured to be a single use heater cassette 64 while the heater 62 may be reused for multiple procedures. For example, the heater cassette 64 may isolate fluid flow such that the heater 62 may be reused with minimal maintenance. The heater cassette 64 may be formed of, for example, polycarbonate or any high heat rated biocompatible plastic and is formed as a single unitary and/or monolithic piece or a plurality of pieces permanently bonded to one another. In some embodiments, the heater cassette 64 may include a fluid inlet port 61 and a fluid outlet port 63 located at a lateral side of the heater cassette 64. The fluid inlet port 61 and the fluid outlet port 63 may each be configured to couple to the supply line(s) 78 of the fluid management system 10. For example, the fluid inlet port 61 may couple the fluid supply source 34 and the fluid warming system 60 (via the inflow pump 50) while the fluid outlet port 63 may couple the fluid warming system 60 with the medical device 20, each via the supply line(s) 78.

In some embodiments, the heater cassette 64 may include an internal flow path along a channel through which fluid may flow from the fluid inlet port 61 to the fluid outlet port 63. The heater cassette 64 may include one fluid path or multiple fluid paths. In some embodiments, the channel may pass through a susceptor 66 which may allow the fluid to be heated via induction heating. When the heater cassette 64 is coupled with the heater 62, the susceptor 66 may be configured to be positioned within an induction coil 68. Other fluid warming system configurations and methods may also be used, as desired. For example, the heater 62 may include one or more heat sources such as, for example a platen system or an inline coil in the supply line(s) 78 using electrical energy. Heating may be specifically designed and tailored to the flow rates required in the specific application of the fluid management system 10. Some illustrative fluid warming systems are described in described in commonly assigned U.S. Patent Application Publication No. 2018/0361055, titled AUTOMATED FLUID MANAGEMENT SYSTEM, the entire disclosure of which is hereby incorporated by reference.

While not explicitly shown, the fluid warming system 60 may include a heater user interface separate from the touch screen interface 42. The heater user interface may simply be a display screen providing a digital display of the internal temperature of the heater 62. In another embodiment, the user interface may also include temperature adjustment buttons to increase or decrease the temperature of the heater 62. In this embodiment, the heater user interface and/or the display screen may indicate the current temperature of the heater 62 as well as the target temperature to be reached. It is noted that all information output from the fluid warming system 60 may be transmitted directly to the display 44 such that no heater user interface is necessary.

The fluid warming system 60 may include one or more sensors configured to monitor the fluid flowing therethrough. For example, temperature sensors 65 may be mounted in the fluid warming system 60 such that they detect the temperature of the fluid flowing through the heater cassette 64. The temperature sensors 65 may be located at or near the fluid inlet port 61 and/or the fluid outlet port 63. In some embodiments, the temperature sensors 65 may be mounted so that they detect the temperature of fluid flowing through the heater cassette 64 prior to the fluid entering the susceptor 66 and after fluid exits the susceptor 66. In some embodiments, additional sensors may be located at a medial portion of the susceptor 66 so that they detect a progression of temperature increase of the fluid in the heater cassette 64. The temperature sensors 65 may remotely send any information to the display 44 or they may send information to heater user interface and/or the display screen thereof, if so provided. In another embodiment, the temperature sensors 65 may be hardwired with the heater user interface (if provided) which is then able to remotely transmit desired information to the display 44. Alternatively, or additionally, the temperature sensors 65 may be hardwired to and/or with the controller 48.

The heater 62 may further include a pressure sensor 67 configured to monitor system pressure and/or a bubble sensor 69 configured to monitor the fluid flowing through the system for bubbles. The heater cassette 64 may include a corresponding pressure sensor interface 71 and bubble sensor interface 73 that allow the pressure sensor 67 and the bubble sensor 69, respectively, to monitor the fluid flowing through the heater cassette 64 when the heater cassette 64 is coupled with the fluid warming system 60. The pressure sensor 67 and/or the bubble sensor 69 may remotely send any information to the controller 48, the display 44, and/or they may send information to the heater user interface and/or the display screen thereof, if so provided. In another embodiment, the pressure sensor 67 and/or the bubble sensor 69 may be hardwired with the heater user interface (if provided) which is then able to remotely transmit desired information to the display 44. Alternatively, or additionally, the pressure sensor 67 and/or the bubble sensor 69 may be hardwired to and/or with the controller 48.

The pressure signal received from the pressure sensor 74 of the medical device 20 and/or from the pressure sensor 67 within the fluid management system 10 may fluctuate quite a bit. In some cases, the fluctuations may be due to pulses in the fluid due to pulsations at the inflow pump 50. The pulses may vary depending on a flow rate of the fluid. FIGS. 6-9 illustrate some example pressure signal profiles that may occur in the fluid management system. However, these profiles are not intended to represent all possible pressure signal profiles. Different pressure signal profiles may each include a unique obstacle to controlling the intracavity pressure and/or the delivery pressure during use of the medical device 20.

Figure 6:
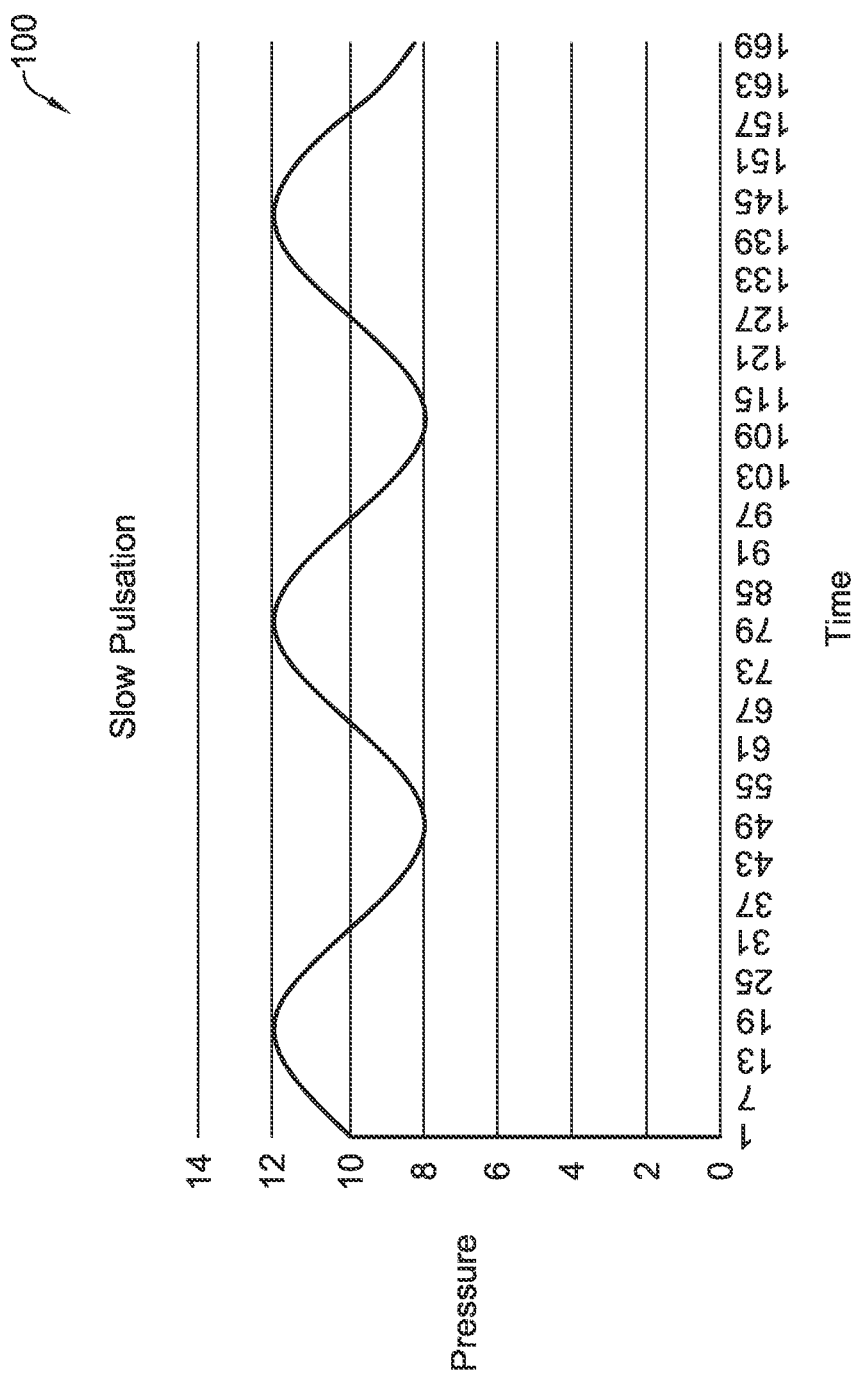
FIGS. 6-9 are illustrative raw data profiles.
Figure 7:
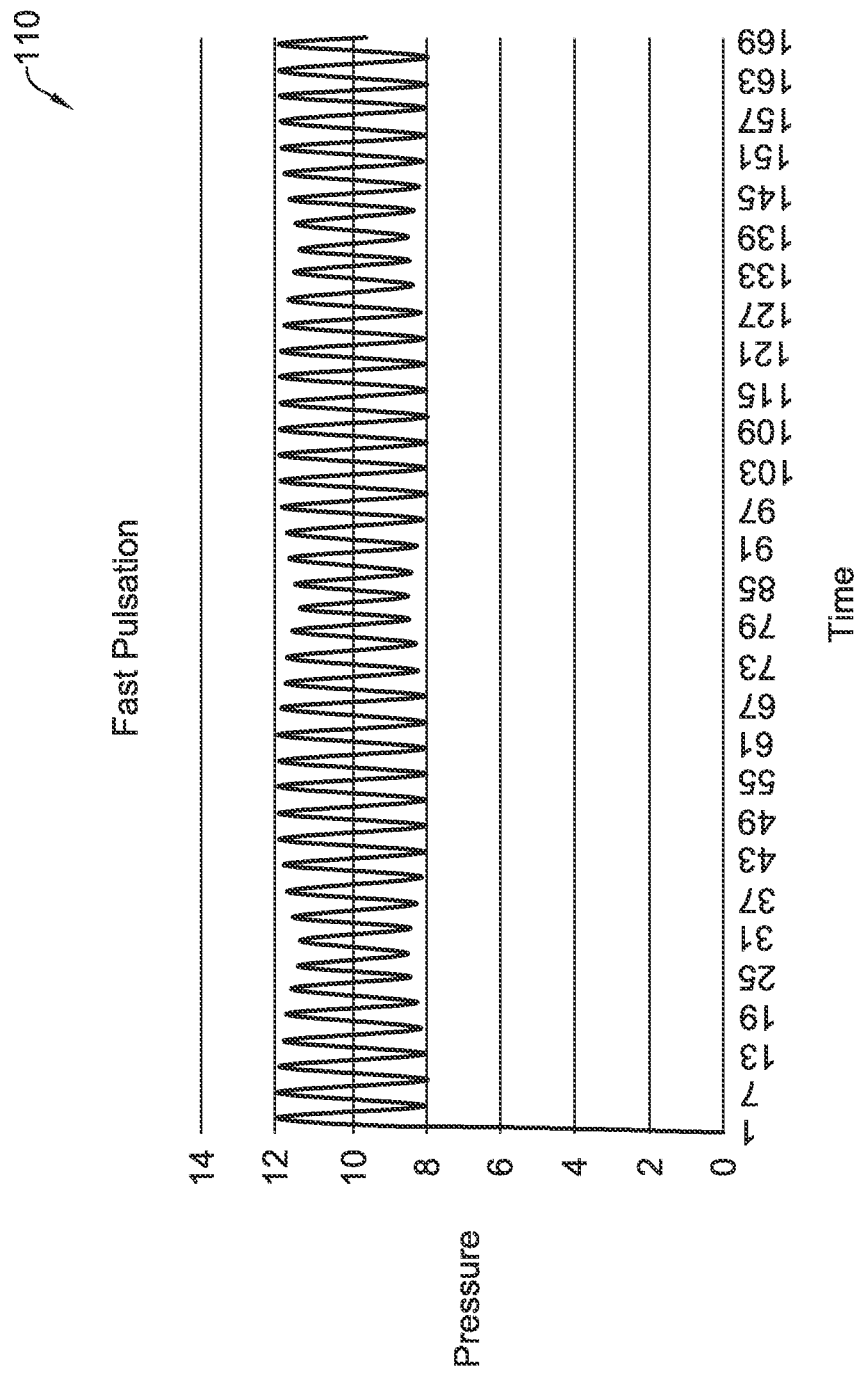
Figure 8:
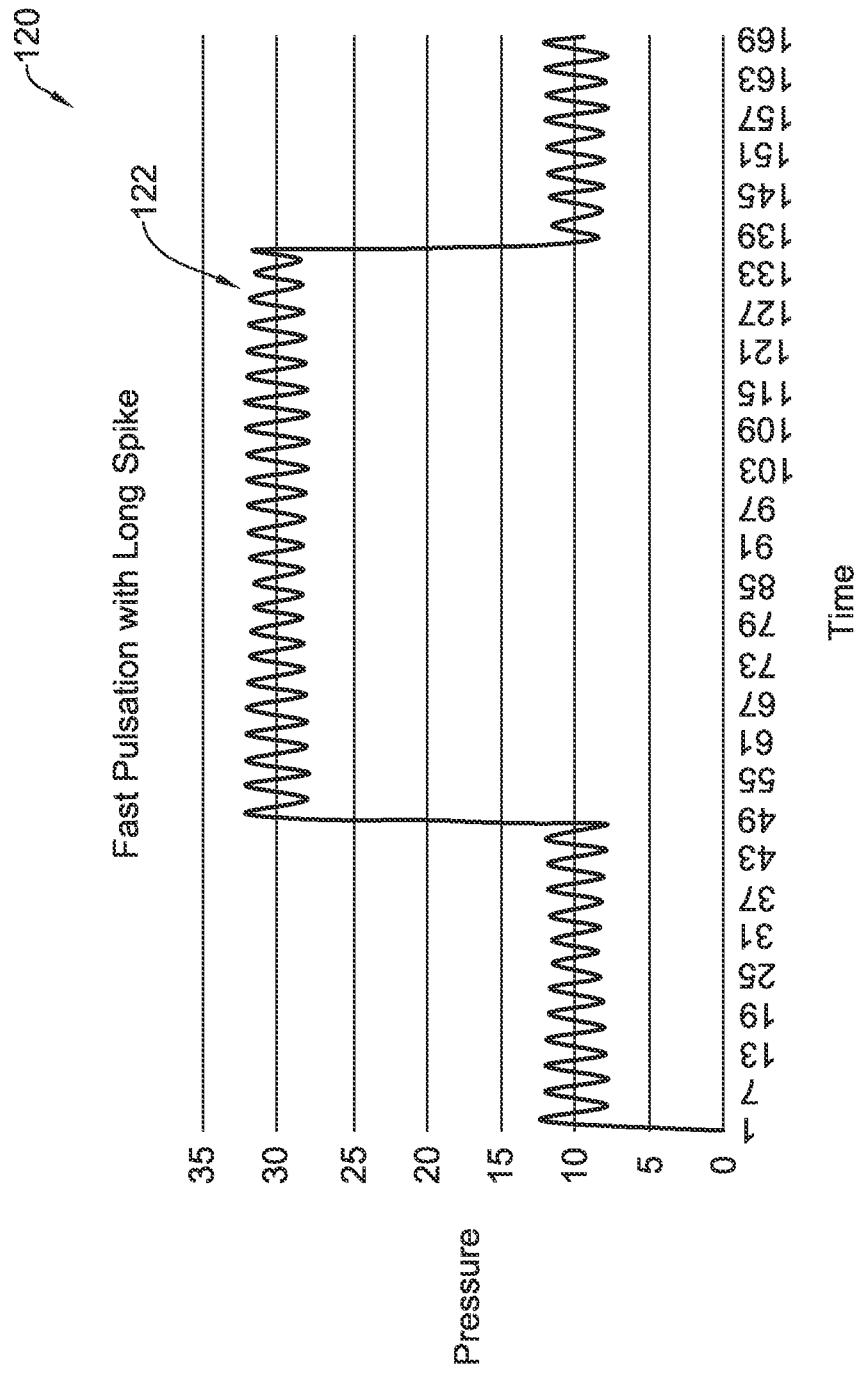
Figure 9:
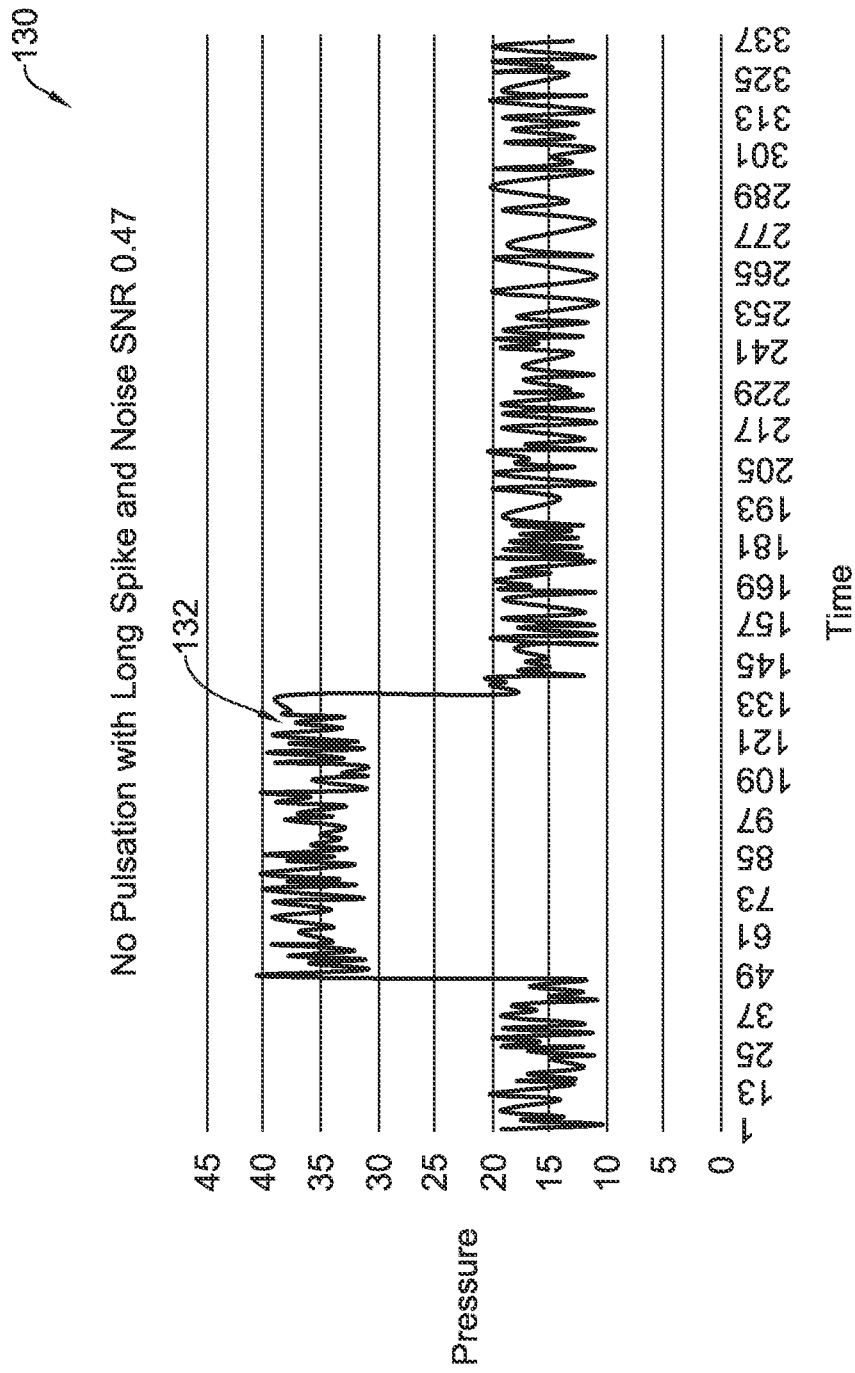

FIG. 6 illustrates an example pressure profile 100 of a slow pulsation. In this instance, when using a normal average of the pressure signal, only a section of the data may be captured. This may result in a higher or lower than actual average value being used as the pressure signal depending on the second of data analyzed. FIG. 7 illustrates an example pressure profile 110 of a fast pulsation. If the fluid management system 10 attempts to use a fast pulsing pressure signal to control the flow of fluid, the controller 48 may track the oscillation of the pressure signal and cause further oscillation within the system 10 as the controller 48 tracks an unstable set point. FIG. 8 illustrates an example pressure profile 120 of a fast pulsation with a long spike or increase in pressure. In this example, the profile 120 show a clear and sustained increase 122 in the pressure signal which needs to be identified and recognized by the controller 48. The pressure increase and the duration of the spike 122 are important to the control of the system 10 and should not be treated as noise. FIG. 9 illustrates an example pressure profile 130 that does not include pulsation but does includes a clear and sustained increase 132 in the pressure signal. The pressure profile 130 shows a highly noisy signal where there is no pulsation (e.g., lots of spikes and drops in the pressure signal that are not due to pulsation of the fluid). This may be caused by noise in the signal. In the illustrated pressure profile 130, the pressure signal has a signal to noise ratio (SNR) of 0.47. This type of pressure profile may indicate that the quality of the pressure signal is at an unacceptable level.

To compensate for the varying nature of the pressure signal data, a configurable or adaptive data filter may be used to perform digital signal processing (DSP) on the pressure signal data and provide the profiled data to a sub system of the FMS 10. The adaptive data filter may be used to analyze the pressure signal data independent of other programs or sub systems of the FMS 10. Thus, the same pressure data set can be analyzed in various forms to provide the most accurate data for a particular sub system or use application of the FMS 10. Further, other data signals may be analyzed using a similar adaptive filter. For example, the weight of the fluid supply source 34 may be measured and used by the FMS 10 to provide an output that meets the needs of the control logic of the inflow pump 50, or other sub system.

Figure 10:
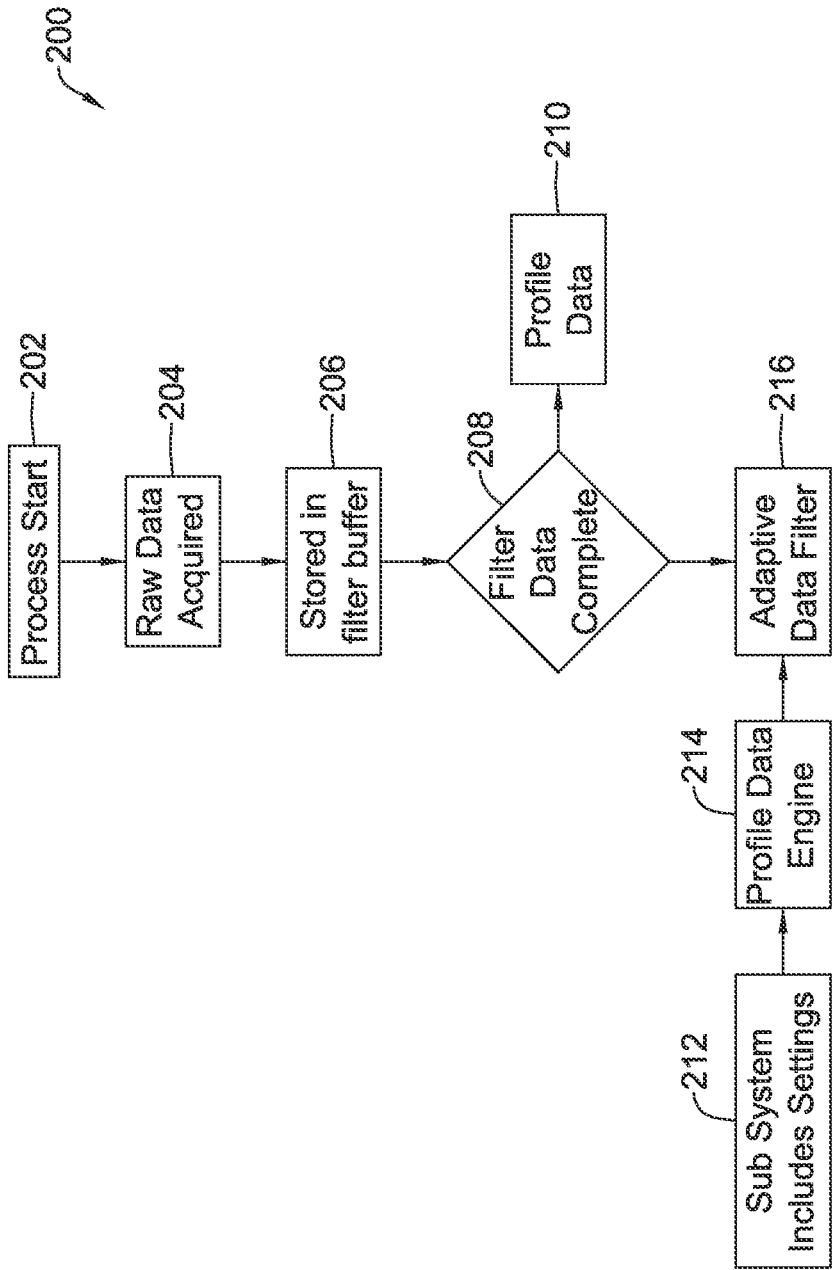
FIG. 10 is an illustrative flow chart of a method of using and performing adaptive filtering of a data signal.

FIG. 10 is an illustrative flow chart of a method 200 of using and performing adaptive filtering of a pressure signal. While the method 200 is described with respect to pressure signals, it should be understood that the method may be applied to other data signals used to provide inputs to control logic of the various components of the FMS 10. For example, the weight of the fluid supply source 34, flow rate of the fluid, temperature of the fluid, etc. are just some additional data signals that can be filtered using the described adaptive filtering techniques described herein.

The illustrative method 200 may be performed by control logic stored in a memory of the controller 48 and/or the workstation 81. The illustrative method 200 illustrated in FIG. has two starting points which meet in the middle. At a first starting point, a task is started (e.g., a control command issued) to request data signals be acquired or collected at a predetermined time interval, as shown at block 202. For example, a pressure data signal may be requested or captured every millisecond. This is just an example. Other data collection frequencies or intervals may be used as desired or appropriate. The pressure data signal may be collected, for example, at the pressure sensor 74 mounted on the medical device 20, or other pressure sensor as appropriate. In some cases, the controller 48 and/or workstation 81 may begin gathering data upon receiving a request from the physician via the user interface 42, 83. In other embodiments, the controller 48 and/or workstation 81 may be programmed to automatically initiate the collection of the data signals at a predetermined time or when the FMS 10, or a sub system thereof, is turned on. After the data gathering task is initiated, raw data signals, such as, but not limited to, pressure data signals are acquired, as shown at block 204. The raw data signals are stored in a buffer, as shown at block 206. The raw data signals are stored in the buffer until a predetermined minimum number of samples have been acquired. Thus, the controller 48 and/or workstation 81 continues to acquire data signals at the predetermined time intervals until the filter buffer is complete (e.g., has the minimum number of data samples), as shown at block 208. Upon completion of the filter buffer, the controller 48 and/or workstation 81 may be configured to use the raw data signals and settings from one or more sub systems of the FMS 10 to create profiled data, as shown at block 210. The profiled data may be based on configuration information received from a sub system that will use the data, as will be described in more detail herein. Some illustrative profiled data are illustrated in FIGS. 6-9. This profiled data may be filtered using an adaptive data filter, as will be described in more detail herein. It is contemplated that a same data set may be analyzed (or profiled) to provide the most accurate data for a particular sub system. For example, more than one sub system may utilize pressure data signals. However, each sub system may function optimally with a focus on different aspects of the data signals.

At a second starting point, a sub system that will use the raw and/or filtered data signals includes programming or is configured to receive user input to determine a configuration of how the data is to be profiled, as shown at block 212. The sub system may request the data signals to be analyzed or profiled in various methods. These requests may include, but are not limited to: maximum value of the raw data, minimum value of the raw data, average value of the raw data, SNR of the raw data, maximum value of the filtered data, minimum value of the filtered data, average value of the filtered data, frequency, spike detection, peak to peak pulsation, etc. The sub system passes the configurations or settings to the profile data engine, as shown at block 214. The settings are stored in the profile data engine and are used to generate the profiled data. The profiled data may be used as raw data signals or processed using an adaptive data filter, as shown at block 216.

Figure 11:
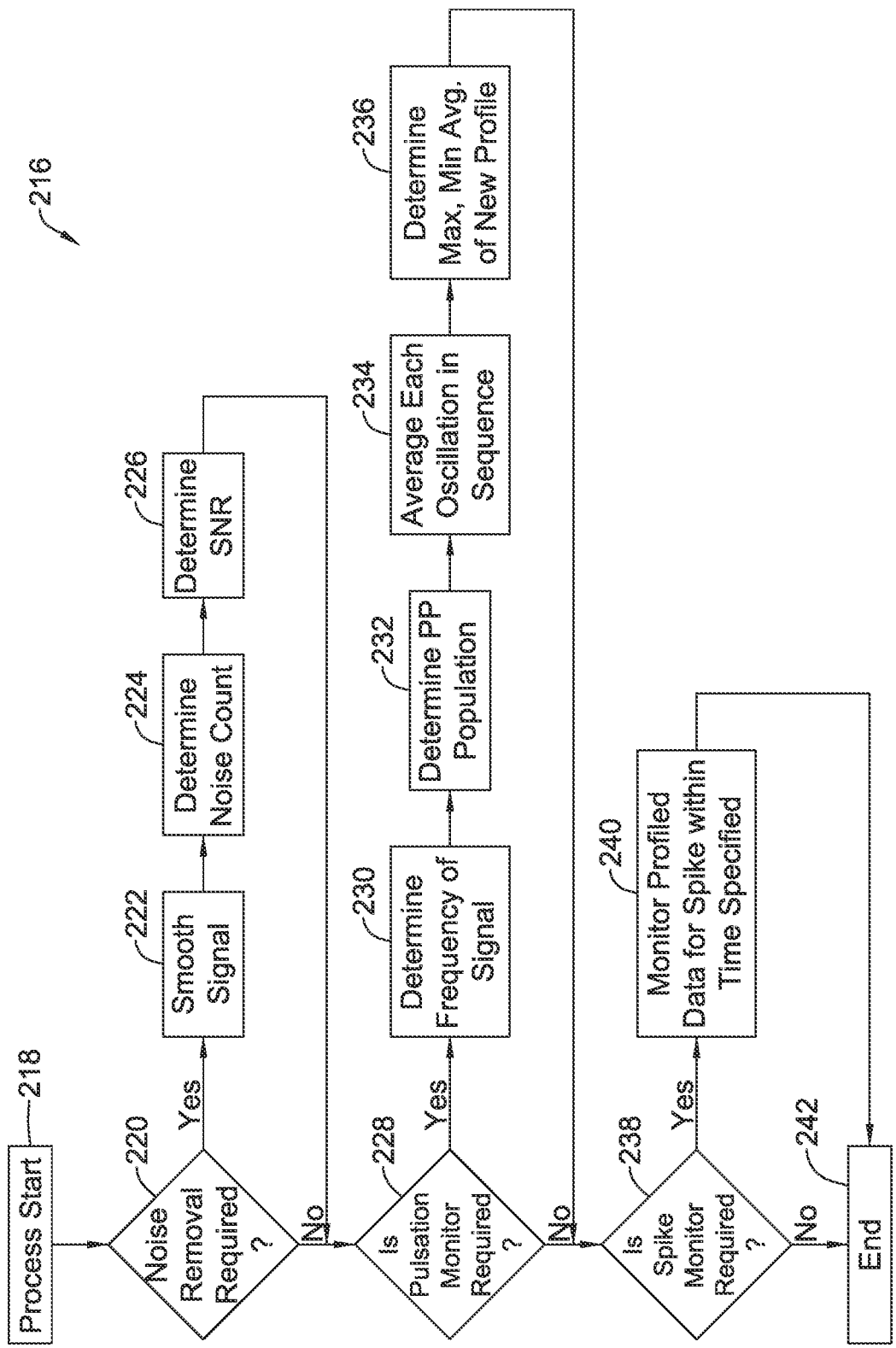
FIG. 11 is an illustrative flow chart of a method of performing adaptive filtering of a data signals.

FIG. 11 is an illustrative flow chart of a method for processing data signals 216 with an adaptive data filter. The method begins a sub system requesting the data to be profiled and filtered, as shown at block 218. As a part of the request, the sub system may provide a number of settings to be incorporated into the data analysis. The illustrative method 216 may be performed by control logic stored in a memory of the controller 48 and/or the workstation 81. Generally, the control logic is an algorithm or filter for digital signal processing of the data signal profile. The filter may adapt or change as it processes different signals according the inputs received from the sub system and/or based on the raw data itself. The filter may perform multiple passes over the profiled data. Each pass may monitor and analyze the signal with respect to a different feature of the signal. In some cases, a particular pass may be skipped if the control logic determines it is not necessary. Thus, the filter may adapt or change based on the signal being analyzed and/or based on the sub system which will utilize the data signal.

To begin, the control logic may determine if removal of noise from the data signal profile is required, as shown at block 220. If noise removal is required, the filter is adjusted (e.g., the control logic changes the setting of the filter) based on the noise tolerance allowed for the given analysis. It is contemplated that the noise tolerance is provided by the sub system requesting the data. The filter then removes any high frequency spikes (e.g., oscillations) from the profiled raw data to provide a smooth signal, as shown at block 222. This may remove any minor fluctuations due to noise from the raw data. The filter may then determine the noise count within the smoothed signal, as shown at block 224. The noise count may then be used to determine the signal to noise ratio (SNR), as shown at block 226. Once the SNR has been determined or if the control logic determines that noise removal is not required, the control logic may then determine if pulsation monitoring is required, as shown at block 228.

If pulsation monitoring is required, the control logic will first determine the frequency of the signal, as shown at block 230. For example, the filter may determine inflection points in the data set and use this as a basis for the filtering. The control logic may then determine the peak to peak pulsation, as shown at block 232. During this step, over or at each inflection point the duration of the time between the last and a subsequent inflection point will be monitored to determine the frequency of the signal pulsation within the data set. The filter may also monitor the data set for pulsation within each inflection point, monitoring for maximum, minimum and average peak to peak deviation. The maximum peak to peak deviation will be used to determine the pulsation of the system. In some cases, if the peak to peak deviation exceeds a predetermined threshold, this may generate an alert The control logic may then average each oscillation in sequence (e.g., one after the other), as shown at block 234. This may provide a smooth value for the sub system to use. The control logic then determines a maximum value, a minimum value, and/or an average value of the filtered profile, as shown at block 236. These values may then be used by the control system of the sub system for determining the actual pressure value of the FMS 10. It is contemplated that even if pulsation monitoring is not required, the control logic may use the maximum value, minimum value, and/or average value of the raw or filtered signal (after any filter pass) if other passes are deemed unnecessary.

Once the maximum value, minimum value, and/or average value have been determined or if the control logic determines that pulsation monitoring is not required, the control logic may then determine if spike monitoring is required, as shown at block 238. If spike monitoring is required, the control logic will analyze the profiled data and determine if a spike exist within the data set, as shown at block 240. In some cases, monitoring for a spike may be performed on a subset of the dataset and can be used to determine if a sudden increase or decrease in pressure (or other variable) has occurred. Once the control logic has determined if a spike has occurred, or if no spike monitoring is necessary, the filtering process may be ended, as shown at block 242. The filtered data profile may then be used by the sub system which initially requested the data to control various aspects of the FMS 10. For example, in response to a sustained pressure increase, the FMS 10 may reduce a fluid flow rate. This is just one example.

The adaptive or variable filtering method described with respect to FIG. 11 be used by any sub system to determine the nature of the signals received to provide fast and reliable results. This may allow the FMS 10 to react quickly and safely to changes in the system. In some cases, the SNR may provide the FMS 10 with a means of detecting system faults and to warn the system and/or operators that the pressure reading (or other variable) may not be accurate and the problem should be addressed. In one example, the adaptive filter 216 may be used to determine the SNR prior to starting a procedure. This may help protect the FMS and/or the patient from potential harm in the event the sensor is not functioning properly. The SNR can also be used in manufacturing as a base line test to ensure wiring and shielding is correct.

The adaptive filter 216 may also provide a means to monitor the pump operation and can be used to determine the rotation speed of the pump using the frequency of the signal. This may also allow the system to monitor for changes in the performance of the pump during the procedure. It is further contemplated that spike detection may allow the control system to take quick actions to protect the system from overpressure conditions that may occur.

In some cases, the adaptive filter 216 may allow the controller 48 and/or workstation 81 to monitor the input signal for out of bounds conditions. For example, the raw data profile and/or the filtered profile may be monitored for signals that exceed a predetermined maximum threshold or are below a predetermined minimum threshold. A raw data profile and/or a filtered profile outside of the predetermined range may be indicative of a failed or malfunctioning sensor and an alert may be sent to a user interface or display 44 of the FMS and/or otherwise provided to the operator thereof.

It is further contemplated that the adaptive filter 216 may allow the controller 48 and/or workstation 81 to analyze a rate of change of the input signal. For example, the raw data profile and/or the filtered profile may be monitored for a rate of change that exceeds a predetermined maximum threshold or is below a predetermined minimum threshold. Rates of change outside of the predetermined range may be indicative of an unstable signal and an alert may be sent to a user interface or display 44 of the FMS 10 and/or otherwise provided to the operator thereof.

Figure 12:
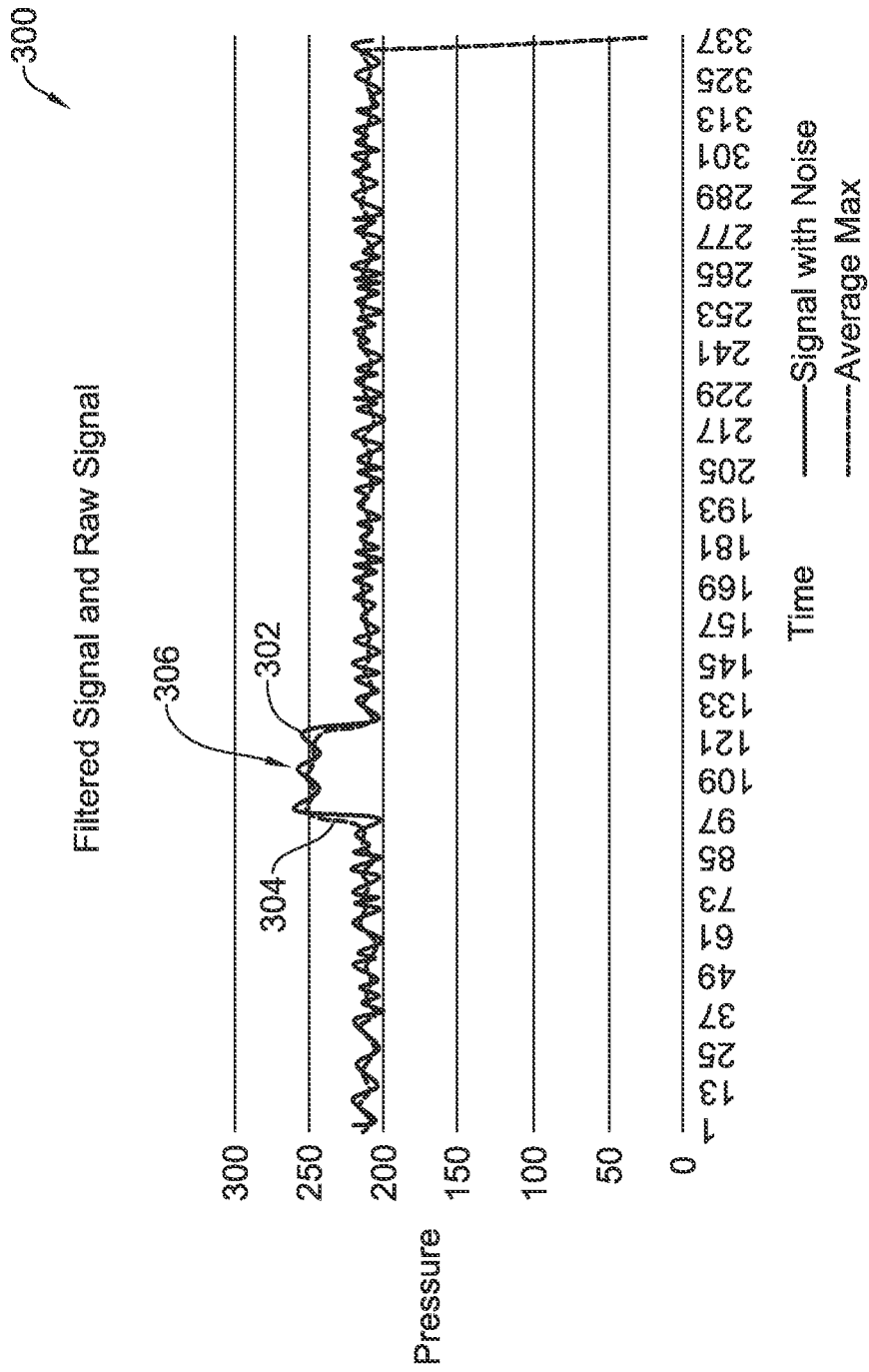
FIGS. 12-13 illustrate filtered data profiles.
Figure 13:
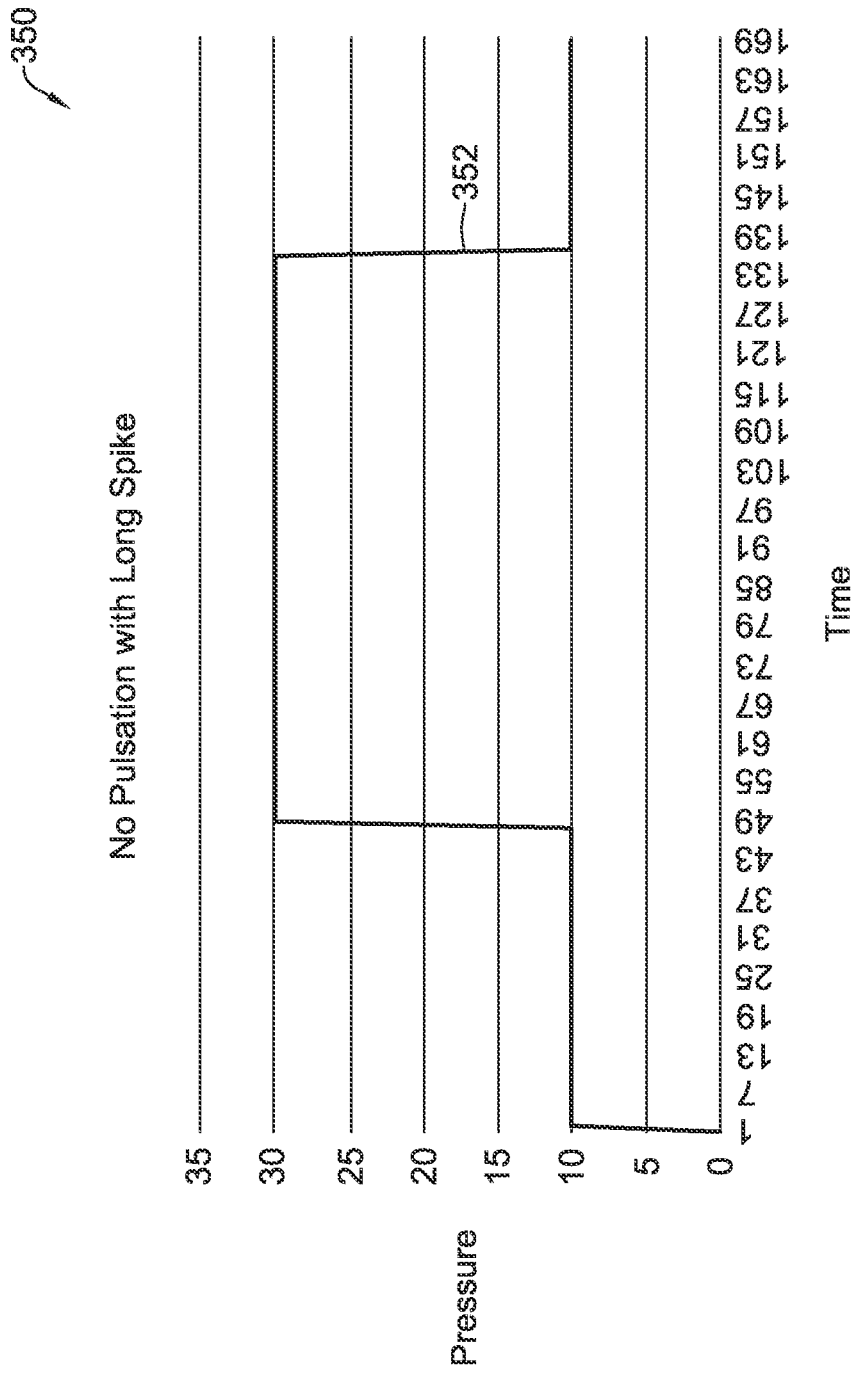

FIG. 12 illustrates a graph 300 including a raw data signal 302 and its corresponding filtered data signal 304. In the illustrated embodiment, the raw data signal 302 was analyzed with the average maximum value as the request from the sub system. The filtered data signal 304 has had the noise reduced, as can be seen in the smoother line of the filtered data signal 304 as compared to the raw data signal 302. Additionally, a spike 306 in the data is visible (e.g., was not removed by the data filter) to the FMS 10 and/or sub system. FIG. 13 illustrates another graph 350 including a filtered data signal 352. In the illustrated embodiment, the adaptive filter 216 has removed all noise from the signal while the spike data remains visible to the FMS 10 and/or sub system.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A method for controlling parameters of a fluid management and medical device system, the method comprising:
   initiating a command at a controller of a fluid management system to acquire a plurality of data signals corresponding to different pressures acquired at predetermined time intervals from a pressure sensor disposed at a distal end of an elongate shaft of a medical device while operating a fluid pump to provide a flow of fluid to a treatment site inside a body of a patient, wherein the pressure sensor is configured to detect an intracavity pressure at the treatment site inside the body of the patient;
   storing the data signals in a buffer until a predetermined minimum number of data signals have been acquired from the pressure sensor of the medical device;
   generating a raw data pressure profile with the plurality of data signals stored in the buffer, the raw data pressure profile based on one or more settings received from a sub system of the fluid management system, wherein generating the raw data pressure profile includes using only pressure data sensed by the pressure sensor while operating the fluid pump to provide the flow of fluid to the treatment site;
   filtering the raw data pressure profile with an adaptive data filter, the adaptive data filter configured to perform one or more passes over the raw data pressure profile to generate a filtered pressure profile; and
   controlling a variable of the fluid management system based on a parameter of the filtered pressure profile to maintain a fluid pressure at the treatment site within a predetermined pressure range;
   wherein each pass of the one or more passes of the adaptive data filter monitors and analyzes a different feature of the data signals.

2. The method of claim 1, wherein the controller is configured to skip or modify any of the one or more passes of the adaptive data filter.

3. The method of claim 1, wherein at least one pass of the adaptive data filter is configured to reduce or eliminate noise in the raw data pressure profile.

4. The method of claim 1, wherein at least one pass of the adaptive data filter is configured to monitor and/or remove pulsation in the raw data pressure profile.

5. The method of claim 1, wherein at least one pass of the adaptive data filter is configured to average each oscillation within the raw data pressure profile.

6. The method of claim 1, wherein at least one pass of the adaptive data filter is configured to determine if a spike is present in the raw data pressure profile.

7. The method of claim 1, wherein the adaptive data filter is configured to receive a noise tolerance input from the sub system.

8. The method of claim 7, wherein the controller is configured to automatically modify the adaptive data filter based on the noise tolerance input.

9. The method of claim 1, wherein the one or more settings provided by the sub system include a maximum value of the raw data pressure profile, a minimum value of the raw data pressure profile, an average value of the raw data pressure profile, and/or a signal to noise ratio of the raw data pressure profile.

10. The method of claim 1, further comprising altering a fluid flow rate, the fluid pressure, or both, within the fluid management system based on a parameter of the filtered pressure profile based on a maximum value of the filtered pressure profile, a minimum value of the filtered pressure profile, average value of the filtered pressure profile, a frequency of the filtered pressure profile, a spike detection of the filtered pressure profile, and/or a peak to peak pulsation of the filtered pressure profile.

11. The method of claim 1, further comprising providing an alert to a user interface of the fluid management system if the filtered pressure profile falls outside of a predetermined range and/or if a rate of change of the filtered pressure profile falls outside of a predetermined range.

12. The method of claim 1, wherein the plurality of data signals further comprise a plurality of weight signals representative of an amount of fluid or a plurality of temperature signals.

13. The method of claim 1, wherein the adaptive data filter is configured to perform two or more passes over the raw data pressure profile, each pass generating a filtered pressure profile.

14. The method of claim 13, wherein each pass of the two or more passes of the adaptive data filter monitors and/or analyzes a different feature of the data signals and the two or more passes vary depending on the one or more settings received from the sub system of the fluid management system.

15. The method of claim 13, wherein controlling the variable of the fluid management system comprises controlling the variable of the fluid management system based on at least one parameter of the filtered pressure profiles.

16. The method of claim 1, wherein the medical device is fluidically coupled to the fluid management system, and wherein the medical device is a cystoscope, an endoscope, or a hysteroscope.

17. A method for controlling parameters of a fluid management and medical device system, the method comprising: initiating a command at a controller of a fluid management system to acquire a plurality of data signals corresponding to different pressures acquired at predetermined time intervals from a pressure sensor disposed at a distal end of an elongate shaft of a medical device while operating a fluid pump to provide a flow of fluid to a treatment site inside a body of a patient, wherein the pressure sensor is configured to detect an intracavity pressure at the treatment site inside the body of the patient; storing the plurality of the data signals from the pressure sensor of the medical device in a buffer until a predetermined minimum number of data signals have been stored; thereafter, generating a raw data pressure profile with the plurality of data signals previously stored in the buffer, the raw data profile based on one or more settings received from a sub system of the fluid management system, wherein generating the raw data pressure profile includes using only pressure data sensed by the pressure sensor while operating the fluid pump to provide the flow of fluid to the treatment site; filtering the raw data pressure profile with an adaptive data filter configured to perform a plurality of passes over the raw data pressure profile to generate a filtered pressure profile, the plurality of passes configured to reduce or eliminate noise in the raw data pressure profile, monitor and/or remove pulsation in the raw data pressure profile, average each oscillation within the raw data pressure profile, and/or determine if a spike is present in the raw data pressure profile; and controlling a variable of the fluid management system based on a parameter of the filtered pressure profile to maintain a fluid pressure at the treatment site within a predetermined pressure range; wherein the plurality of passes is varied and/or are omitted based on the one or more settings received from the sub system of the fluid management system.

18. The method of claim 17, wherein the medical device is fluidically coupled to the fluid management system, and wherein the medical device is a cystoscope, an endoscope, or a hysteroscope.

19. A method for controlling parameters of a fluid management and medical device system, the method comprising:

initiating a command at a controller of a fluid management system to acquire a plurality of data signals corresponding to different pressures acquired at predetermined time intervals from a pressure sensor disposed at a distal end of an elongate shaft of a medical device while operating a fluid pump to provide a flow of fluid to a treatment site inside a body of a patient, wherein the pressure sensor is configured to detect an intracavity pressure at the treatment site inside the body of the patient;

storing the plurality of data signals that were acquired from the pressure sensor of the medical device at the predetermined time intervals in a buffer until a predetermined minimum number of data signals have been stored in the buffer;

thereafter, generating a raw data pressure profile with the plurality of data signals stored in the buffer, the raw data pressure profile based on one or more settings received from a sub system of the fluid management system, wherein generating the raw data pressure profile includes using only pressure data sensed by the pressure sensor while operating the fluid pump to provide the flow of fluid to the treatment site;

filtering the raw data pressure profile with an adaptive data filter, the adaptive data filter configured to perform one or more passes over the raw data pressure profile to generate a filtered pressure profile; and controlling a variable of the fluid management system based on a parameter of the filtered pressure profile to maintain a fluid pressure at the treatment site within a predetermined pressure range;

wherein each pass of the one or more passes of the adaptive data filter monitors and analyzes a different feature of the data signals and the one or more passes vary depending on the one or more settings received from the sub system of the fluid management system.

20. The method of claim 19, wherein the medical device is fluidically coupled to the fluid management system, and wherein the medical device is a cystoscope, an endoscope, or a hysteroscope.

* * * * *